(12) United States Patent
Mizrah

(10) Patent No.: US 7,577,987 B2
(45) Date of Patent: Aug. 18, 2009

(54) OPERATION MODES FOR USER AUTHENTICATION SYSTEM BASED ON RANDOM PARTIAL PATTERN RECOGNITION

(75) Inventor: Len L. Mizrah, San Carlos, CA (US)

(73) Assignee: Authernative, Inc., Walnut Creek, CA (US)

( * ) Notice: Subject to any disclaimer, the term of this patent is extended or adjusted under 35 U.S.C. 154(b) by 759 days.

(21) Appl. No.: 10/378,226

(22) Filed: Mar. 3, 2003

(65) Prior Publication Data
US 2004/0123151 A1    Jun. 24, 2004

Related U.S. Application Data

(63) Continuation-in-part of application No. 10/328,640, filed on Dec. 23, 2002, and a continuation-in-part of application No. 10/353,500, filed on Jan. 29, 2003.

(51) Int. Cl.
*H04L 9/32* (2006.01)
(52) U.S. Cl. .................. 726/5; 726/18; 726/19
(58) Field of Classification Search .......... 726/2, 726/5, 18, 19
See application file for complete search history.

(56) References Cited

U.S. PATENT DOCUMENTS

| | | | |
|---|---|---|---|
| 5,177,789 A | 1/1993 | Covert | |
| 5,276,314 A | 1/1994 | Martino et al. | |
| 5,425,102 A * | 6/1995 | Moy | 713/183 |
| 5,428,084 A | 6/1995 | Swarup et al. | |
| 5,465,084 A | 11/1995 | Cottrell | |
| 5,559,961 A | 9/1996 | Blonder | |

(Continued)

FOREIGN PATENT DOCUMENTS

EP    0564832 A1    10/1993

(Continued)

OTHER PUBLICATIONS

The Dartmouth Lawyers Association Community Forum—"About Email Registration" Excerpts published May 21, 2001 and May 23, 2001 http://64.71.135.247/dcforum/DCForumID2/11.html#.*

(Continued)

*Primary Examiner*—Gilberto Barron, Jr.
*Assistant Examiner*—Thomas Gyorfi
(74) *Attorney, Agent, or Firm*—Haynes Beffel & Wolfeld LLP

(57) ABSTRACT

A system for authentication of a client includes logic supporting a "what user knows" algorithm for authentication of a client, such as a random partial pattern recognition algorithm, based upon client credentials including an account user name and an account authentication code. Logic supporting client account administration is operable without human intervention on the server side, and includes at least one mode of operation that presents an interface to a client via the data network having at least two tiers of security based on input by the client of secret information shared only between the client and the server. A first tier in said at least two tiers requires entry of one of the account user name and user's email address, and a second tier in the at least two tiers requires entry of one of client profile data sufficient to identify the client and at least a subset of said account authentication code.

18 Claims, 17 Drawing Sheets

U.S. PATENT DOCUMENTS

| | | | |
|---|---|---|---|
| 5,608,387 A | | 3/1997 | Davies |
| 5,664,099 A * | | 9/1997 | Ozzie et al. .................. 726/29 |
| 5,821,933 A * | | 10/1998 | Keller et al. ................. 715/741 |
| 5,839,119 A * | | 11/1998 | Krsul et al. ................... 705/39 |
| 5,928,364 A * | | 7/1999 | Yamamoto .................. 726/18 |
| 6,085,320 A | | 7/2000 | Kaliski, Jr. |
| 6,141,751 A | | 10/2000 | Ogawa |
| 6,161,185 A * | | 12/2000 | Guthrie et al. ................. 726/5 |
| 6,189,098 B1 | | 2/2001 | Kaliski, Jr. |
| 6,209,104 B1 * | | 3/2001 | Jalili ............................ 726/18 |
| 6,321,339 B1 * | | 11/2001 | French et al. .................. 726/2 |
| 6,332,192 B1 | | 12/2001 | Boroditsky et al. |
| 6,603,854 B1 * | | 8/2003 | Judkins et al. .......... 379/265.06 |
| 6,789,110 B1 * | | 9/2004 | Short et al. ................. 709/221 |
| 6,812,938 B2 * | | 11/2004 | Pinnell ........................ 715/741 |
| 6,980,081 B2 * | | 12/2005 | Anderson .................. 340/5.53 |
| 2001/0039618 A1 | | 11/2001 | Azuma |
| 2002/0029341 A1 | | 3/2002 | Juels et al. |
| 2005/0044425 A1 * | | 2/2005 | Hypponen .................. 713/202 |
| 2005/0044452 A1 * | | 2/2005 | Suzuki et al. ................. 714/38 |

FOREIGN PATENT DOCUMENTS

| | | |
|---|---|---|
| EP | 1223524 A2 | 7/2002 |
| JP | 6083777 | 3/1994 |
| JP | 9097238 | 4/1997 |
| JP | 10293799 | 11/1998 |
| JP | 2002007342 | 1/2002 |
| WO | WO 02/073377 A2 | 9/2002 |

OTHER PUBLICATIONS

Bolande, H. Asher, "Forget passwords, what about pictures?" WSJ Interactive Edition, Nov. 27, 2000.

Dhamija, Rachna, et al., "Déjà vu: A User Study Using Images for Authentication," SIMS/CS, University of California Berkeley, http://paris.cs.berkeley.edu/%7Eperrig/projects/usenix2000/usenix.pdf.

Haubert, William H. III, "An Interactive Approach to Secure and Memorable Passwords," A Thesis in TCC 402 presented to the Faculty of School of Engineering and Applied Science, Unversity of Virginia, Mar. 25, 2002, 1-22.

Jermyn, Ian, et al., "The Design and Analysis of Graphical Passwords," Proceedings of the 8th USENIX Security Symposium, Washington, D.C. Aug. 23-26, 1999, 15 pages.

Lee, Jennifer 8, "And the Password is . . . Waterloo," New York Times, Dec. 27, 2001, 6 pages.

Lemos, Robert, "Passwords: The weakest Link?" CNET News.com, May 22, 2002, http://news/com.com/2009-1001-916719.html.

"Déjà vu: Using Images for User Authentication" Nov. 12, 2002, http://www.sims.berkeley.edu/%7Erachna/dejavu/.

Perrig, Adrian, et al., "Hash Visualization: a New Technique to improve Real-World Security," Computer Science Department, Carnegie Mellon University, 1-8, http://paris.cs.berkeley.edu/%7Eperrig/projects/validation/validation.pdf.

"The Science Behind Passfaces", Sep. 2001, Real User Corporation, http://www.realuser.com/published/ScienceBehindPassfaces.pdf.

Reynolds, Martin, "Microsoft TechFest Signposts Software Futures," Gartner Dataquest Perspective, Gartner, Inc., 2002.

* cited by examiner

OPERATION MODES FOR USER AUTHENTICATION SYSTEM BASED ON RANDOM PARTIAL PATTERN RECOGNITION

RELATED APPLICATION DATA

The present application is a continuation in part of my prior U.S. patent application Ser. No. 10/328,640, filed 23 Dec. 2002, entitled "Authentication System and Method Based upon Random Partial Pattern Recognition;" and a continuation in part of my prior U.S. patent application Ser. No. 10/353,500; filed 29 Jan. 2003, entitled "System and Method for User Authentication Interface."

BACKGROUND OF THE INVENTION

1. Field of the Invention

The invention relates generally to operation modes for user authentication systems, used for computer and network security access control systems; and more particularly to account set up and reset modes using graphical user interfaces supporting authentication systems in client-server network architectures and other architectures.

2. Description of Related Art

The most widely used user authentication method is referred to herein as the Standard Static Password Recognition (SSPR) algorithm. The SSPR algorithm simply requires a user to enter a user name and a password for authentication.

Typical users select passwords for SSPR within a "comfort level" of complexity for memorization, usually in the range from one to seven (or eight) alphanumeric characters long. Often, the password is a simple word or an integer number (like, "patriot", "London", 11223344, etc.). Technological progress and demands of contemporary industrial society security lead to at least two serious issues related to the safety of typical passwords in SSPR, including:

1. An intruder may employ a brute-force technique, known as a Dictionary attack, of successively trying all the words in an exhaustive list against a password file. Each consecutive tried word gets encrypted using the same algorithm that the login program under attack is using. Dictionary attacks, applied either to hashed passwords, intercepted on communication lines, or directly at the password entry devices, allow for quite easy password re-engineering.
2. Another issue is related to password combinatorial capacities of typical passwords that are within a "comfort level" of complexity for most users. For larger organizations, a range of passwords within such comfort level may not be sufficient.

Typical enterprise level solutions (enterprise-wide IT department policies) in accounting for items 1 and 2 above, require users to have at least 4-5 (or more) alphanumeric case sensitive character passwords, which should not to be simple words (but rather something, like: 1patRIOT, Lon7Don, etc.). This approach leads to multiple password resets by users that forget or lose their passwords, which resets have become quite costly and annoying hurdles for organizations and enterprises (or service companies) striving for higher security levels.

Objective consideration shows that the minimum number of characters in a password is limited at a minimum by two factors: necessary combinatorial capacities and high susceptibility to combinatorial attacks. The maximum number of characters in static passwords is limited by users' "comfort level" for memorization. Eventually, one ends up with 4-8 alphanumeric characters range (no character case sensitivity), or 3-7 alphanumeric characters (having character case sensitivity). Until recently, organizations and enterprises (or service companies) have tolerated these well known deficiencies due to relative simplicity, low cost, and wide spread adoption of SSPR user authentication technology.

Meanwhile, emerging requirements are forcing the security industry (Authentication-Authorization-Accounting (AAA or 3A) programs, Encryption, Enterprise Software, Financial Service Providers, etc.) to re-consider SSPR based user authentication technology:

1. The first issue is progress in ASIC chip data-processing power, which makes combinatorial attacks in breaking static passwords much more efficient. The apparent line of defense would be increasing static password lengths. Unfortunately, as we already discussed, this capability is already quite limited by users' "comfort level". So, SSPR based security systems appeared to be in between a rock and a hard place, as the minimum password length (3-4 alphanumeric characters) must be increased to sustain more and more efficient combinatorial attacks, whereas the entire static password length has to be remained unchanged and limited to 6-7 alphanumeric characters range due to human being memory limitations.
2. Also, a number of security problems arising in large scale systems, like deficiencies in state/country voting systems, credit card fraud, privacy and security breaches at health data banks and at financial service organizations, Microsoft 2000 and XP operating systems' vulnerabilities, etc., have led to the necessity to improve or re-build large scale security systems. Evolution of these systems will eventually require much higher static password combinatorial capacity, than may be required at an organization/enterprise level. Assuming, about 10 million users at a state level and about 100 million users nation wide, passwords having at least 5 characters are needed for a state-wide system, and passwords having at least 6 characters are needed for country wide password based security systems (assuming no character case sensitivity, or 4 and 5 characters respectively for a character sensitive case). As processing power in the hands of hacker increases, the minimum password size for a secure system approaches or exceeds the "comfort level".
3. Once national security systems, databases and various markets get integrated internationally (say US and EU), the number of users requiring unique passwords increases to the point that the combinatorial capacity of such systems would require at least 6 alphanumeric characters (case sensitive passwords), or 7 for systems without character case sensitivity. This is already at the boundary of users' "comfort level".

Accordingly, SSPR is reaching the limits of its practical application for large-scale static password based security systems. That accounts for serious attention recently given to alternative high security user authentication methods, like biometrics, tokens, and smart cards. Of these techniques, biometrics is the only true user authentication method. The other ones can be a part of user authentication systems, but are insufficient by themselves.

Unfortunately, biometrics is great deal more expensive and difficult to deploy, than SSPR based systems. There is, also, a significant public reluctance against biometric authentication methods due to religious and cultural concerns. Another strong concern, if using biometrics, is private biometric data safety. Once stolen, the biometric data can be re-used forever to impersonate the individual that the data is taken from.

B. Attacks Against SSPR Based Systems

Besides several issues listed above, static password technology is particularly vulnerable to a number of attacks, and defenses against such attacks have limited scope. Some of the possible attacks and defenses to the attacks, include the following:

1. Password Guessing

An intruder tries to log in with a real user name while making password guesses based on the user personal knowledge.

Defense—automatic session lock out after several failed attempts; possible account revoke or a forced password reset 2. Log-In Session Videotaping Widely available micro audio and visual sensors, and other tools, facilitate hidden observations. Video- and/or audio-recording is possible from a significant distance and any time of the day, jeopardizing secret passwords or PINS entered by computer or network online users at public locations (ATM machines; customers at Point-Of-Sales; Internet terminals offered at various conferences, cafes, libraries; employees sharing large offices with desktop computer terminals within everybody's visual reach, and other places).

Defense—no standard protection technology except being vigilant.

3. Shoulder Surfing

An intruder nearby the legitimate user watches password entering.

Defense—no standard protection technology except displaying echo dummy characters and different number of them.

4. Social Engineering

An intruder pretends to be an administrator or a real user asking for a password disclosure/reset.

Defense—non disclosure/reset policy.

5. Trojan Horse

Hidden downloaded software looking like a standard login session but collecting instead user names and passwords.

Defense—some protection is possible for vigilant users and administrators with antivirus protection and intrusion detection software.

6. Keystroke Monitoring

Secretly downloaded software keeping a log of all keystrokes

Defense—employees are defenseless, if the employer is the attack originator; legal protection is a possible alternative.

7. Con Artists

Can figure out the password while being quite far from the real user and having special hearing/observation skills/training.

Defense—no standard protection technology except being vigilant.

8. Network Sniffing

An intruder records user names and passwords while in transit on communication lines.

Defense—encryption protocols: Kerberos, SSL, IPsec; challenge response, one time passwords with tokens or smart cards; biometrics instead of passwords.

9. Keyboard Buffer Memory Sniffing

Some desktop operating systems do not have hardware protection against intruders' software copying passwords from a keyboard buffer.

Defense—no standard protection except making hardware protection at a microprocessor level.

10. Password File Theft

Every user name has a password entry in a hashed form which can be read.

Defense—Needham-Guy algorithm is used: each password is an encryption key for itself to be hash encrypted.

All attacks above can be separated out into three different categories: communication line attacks (8, dictionary attack), attacks at input/output devices (1, 2, 3, 4, 5, 6, 7, 9), and database attacks (10).

C. Enhanced Security Requirements

As manifested by the list of attacks above, SSPR security technology is vulnerable to well known security breaches. SSPR is based on "what user knows", as opposed to other authentication factors based on "what user has" (for instance, hardware tokens), or "what user is" (such as biometric traits, like, fingerprints, face, eye, and voice recognition). It is well known, "what user knows"-based authentication systems are the most attractive due to being cheap, user friendly, easily electronically deployable, and requiring no additional hardware, as opposed to other authentication factors. That is why numerous attempts have been made to improve SSPR technology and satisfy the requirements of the Internet mass transaction and e-commerce community. Several enhanced user authentication security requirements include the following:

1. Even without encryption, authentication secrets (like passwords or PINS) shared between a client and a server should not be revealed, if the data are intercepted by an intruder, while in transit on communication lines.
2. Authentication system is to demonstrate strong resilience against attacks at input/output devices (see, for example, B1-B7, B9).
3. "What user knows"-based authentication system should use secret knowledge shared with a server, which is easier than, or of comparable difficulty for a human being to remember as compared to static passwords. Otherwise, the system does not have a chance to be widely adopted.
4. Client and server have to perform mutual authentication to each other.
5. Client should be able to get authenticated to by server and get access to protected resources from any computer platform on the Internet.
6. Authentication system should have zero footprint downloaded software on the client computer platform.
7. No additional hardware as compared to SSPR technology.
8. Easy and cheap match to any other authentication factor in building "strong authentication" security systems (having two or more authentication factors).
9. Compatible with security of message-oriented Web Services technologies (like SOAP, XML, WSDL, etc.).

Representative prior art authentication technologies are described in Juels, US 2002/0029341; Boroditsky, U.S. Pat. No. 6,332,192; Azuma, US 2001/0039618; Jalili, U.S. Pat. No. 6,209,104; Ozzie, U.S. Pat. No. 5,664,099; Davies, U.S. Pat. No. 5,608,387; Blonder, U.S. Pat. No. 5,559,961; Baker, U.S. Pat. No. 5,428,084; Cottrell, U.S. Pat. No. 5,465,084; and Martino U.S. Pat. No. 5,276,314.

Many approaches promise certain improvements toward meeting some of the requirements (1-9) listed above. However, no known approach (except SSPR) has experienced wide public and industry acceptance. Further, none allow for a comprehensively secure system and method of user authentication, covering the entire list of requirements listed above. Thus, what is needed is an authentication system and method allowing for highly elevated practical security against most of known attacks on communication lines and at data entry devices while assuring sufficient enough combinatorial capacity. In addition, user interfaces for such new authentication systems which contribute to ease of use and security are required.

SUMMARY OF THE INVENTION

The present invention provides an operation mode, and system of operation modes, for account administration with an authentication system based on a new Random Partial Pattern Recognition (RPPR) algorithm and similar algorithms. Operation modes provided according to the invention include on line account set up and account reset modes suitable for use with a "what user knows" based authentication algorithm, and particularly suitable for use with RPPR.

RPPR authentication technology has the positive features of SSPR based security systems, but at the same time, is much stronger in terms of security. RPPR technology is extremely effective against computer data processing dictionary or brute force attacks, password guessing, password file theft, shoulder surfing, eavesdropping, videotaping, Trojan Horse attack, memory sniffing attacks, keystroke monitoring, and network sniffing. At the same time, RPPR provides a "what user knows" authentication method with enormous combinatorial capacity, while remaining within a user's "comfort level" for memorization.

The present invention is embodied by an interactive method for authentication of a client and a user interface for the method. The method is interactive in the sense that the server provides a clue to the client, and the client enters a pattern suggested by the clue. Embodiments of the method utilize a multiple field pattern for recognition, expanding the combinatorial capacity of the technique, and increasing security. Further, embodiments of the method utilize a random partial pattern of a full pattern stored in the server, along with a clue which suggests to the user the data fields from the full pattern to be used for the random partial pattern.

A graphical user interface according to the present invention is produced for display by a data processing system, the data processing system including a display and one or more user input devices. The graphical user interface includes a graphical input construct adapted for display to a user to support entry of a pattern, such as an authentication pattern as described above. The graphical input construct is embodied by computer instructions, stored in client or server memory accessible by the data processing system. The input construct is adapted for prompting users to input patterns comprising one or more data fields having respective field contents. The field contents in the data fields comprise a set of storage units having more than one member. Storage units in the data fields in representative embodiments represent one or more of alpha-numeric characters, images and colors.

Embodiments of the invention include a system for authentication of a client. The system includes a data processor including an interface to a database, an interface to a data network, and authentication system programs executable by the data processor. The system programs include authentication logic supporting a "what user knows" authentication algorithm for authentication of a client based upon client credentials including an account user name and an account authentication code. The system also includes system logic supporting client account administration for the authentication algorithm that operates without human intervention on the server side in some embodiments. The client account administration includes at least one mode of operation that presents an interface to a client via the data network having at least two tiers of security based on input by the client of information known to the client. A first tier in said at least two tiers requires entry of one of the account user name and an email address, and a second tier in the at least two tiers requires entry of one of client profile data sufficient to identify the client and at least a subset of said account authentication code.

Modes of operation in the authentication system administration comprise an account set up mode, an account authentication code reset mode, and a client credential reset mode. For the account set up mode, the interface presented to the client includes a first graphical construct prompting entry of an email address;

a second graphical construct prompting entry of client profile data;

a message, issued in response to acceptance of said email address and said client profile data, to the client using said email address carrying temporary client credentials, including a temporary user name and a temporary authentication code, for the authentication algorithm;

a third graphical construct prompting entry based on said temporary client credentials; and a fourth graphical construct, presented on acceptance of said temporary client credentials via said third graphical construct, prompting entry of chosen client credentials, including the account user name and the account authentication code, for use in the authentication algorithm.

For the account authentication code reset mode for an account, the interface presented to the client includes a first graphical construct prompting entry of said account user name;

a second graphical construct prompting entry of client profile data; and a third graphical construct, presented on acceptance of said account user name and said client profile data via said first and second graphical constructs, prompting entry of a new authentication code of the account for use in the authentication algorithm.

For the client credential reset mode for an account, the interface presented to the client includes a first graphical construct prompting the client for said account user name and for an entry based on said account authentication code; and a second graphical construct, presented on acceptance of said account user name and said entry based on said account authentication code via said first graphical construct, prompting entry of a new credential of the client, including a new client name of the account and a new authentication code of the account, for use in the authentication algorithm.

Embodiments of the invention include system logic, which logs events related to account administration in a security database. The security database is monitored automatically, or by a human operator, to detect unusual account administration activity, to provide an additional level of security to the authentication system.

The input construct includes one or more graphical fields for user entry of said storage units. Upon entry by a user of one of said storage units in a graphical field, a corresponding icon, such as a letter, number, or graphic shape, having a color, is displayed in the graphical field.

The graphical field in the graphical input construct in one embodiment of the invention includes a first window for storage units representing alphanumeric characters, and a second window for storage units representing images, and wherein said storage units representing color are indicated in one of said first and second windows. In various embodiments, the second window of the graphical input construct is coupled with a graphical menu displayed in response to input selecting the second window for input of a storage unit, the graphical menu presenting a set of candidate colors selectable by user input and a set of candidate images selectable by user input.

The input construct in some embodiments comprises a graphical object indicating elapsed time for a user session involving entry of said pattern, and acceptance of said pattern by an authentication server, a graphical object indicating status of a user session involving entry of said pattern, and acceptance of said pattern by an authentication server, and a field indicating a clue to a user concerning field contents of said pattern.

According to embodiments of the method, an ordered set of data fields is stored in secure memory. The data fields in the ordered set include respective field contents, according to a pattern in embodiments preferred for most environments. The server provides a user interface to the client via a communication medium including a clue, such as positions in the ordered set of a random subset of data fields from the ordered set, which identify a random partial pattern form the full pattern stored in the ordered set of data fields. For the purpose of clarity, the term "random" as used herein is meant to include pseudo-random.

In embodiments of the invention, the client enters using a graphical user interface, multiple fields of input data representing the random partial pattern, and the server accepts the input data from the client via a data communication medium. The input data corresponds to the field contents for the data fields at the identified positions in the ordered set. The server then determines whether the input data matches the field contents of corresponding data fields in a random subset. If the input data matches, successful authentication is signaled. Else, a failed authentication is signaled.

In some embodiments of the invention, the process involves presenting to the client an input construct for account set up. The input construct may comprise a graphical user interface presented using an Internet browser or a thin client software. A user provides field contents for an ordered set of data fields in a pattern. In various embodiments, the pattern comprises data based on a cognitive function of position in the ordered set. Also in some embodiments, the input construct enables the client to supply field contents for the data fields in the ordered set including alphanumeric characters, images and colors.

In yet other embodiments, the process includes presentation of a user interface prompting the user to input data for the data fields in the pattern, such as the random subset of the ordered set, by presenting to the user input construct, such as a graphical user interface. In some embodiments, the input construct enables the user to supply field contents for data fields, and the data fields comprise more than one storage unit. The storage units in the data fields in some embodiments represent respective more that one of alphanumeric characters, images and colors, or a combination consisting of storage units representing each of alphanumeric characters, images and colors.

The invention is also embodied by authentication systems based on the client/server architecture, and other architectures. In one embodiment, the process is extended to an authentication server for a large number of users. In this embodiment, the process involves maintaining a secure database of user accounts, including ordered sets of data fields as described above. In this system, attempts to access a protected network resource are detected or otherwise redirected to the server. The server then conducts an authentication session as described above to enable a client to have access to the protected resource.

Systems embodying the present invention include data processing resources including a processor, memory and network interfaces. Authentication server software being executed in the data processing resources carry out the processes for account set up and client authentication, as described above.

RPPR based authentication technology is as user friendly, as cost effective and as electronically deployable as Standard Static Password Technology (SSPR). At the same time, security is much higher using RPPR based authentication, as compared to SSPR. It allows for effective protection from multiple intruding attacks at data entry devices as well as on communication lines, while data are in transit. RPPR based authentication technology is applicable to hardware and human clients, while having scalable security allowing for trade offs involving cost, business requirements, and hardware resources.

Other aspects and advantages of the present invention can be seen on review of the drawings, the detailed description and the claims, which follow.

DETAILED DESCRIPTION

Figure 1:
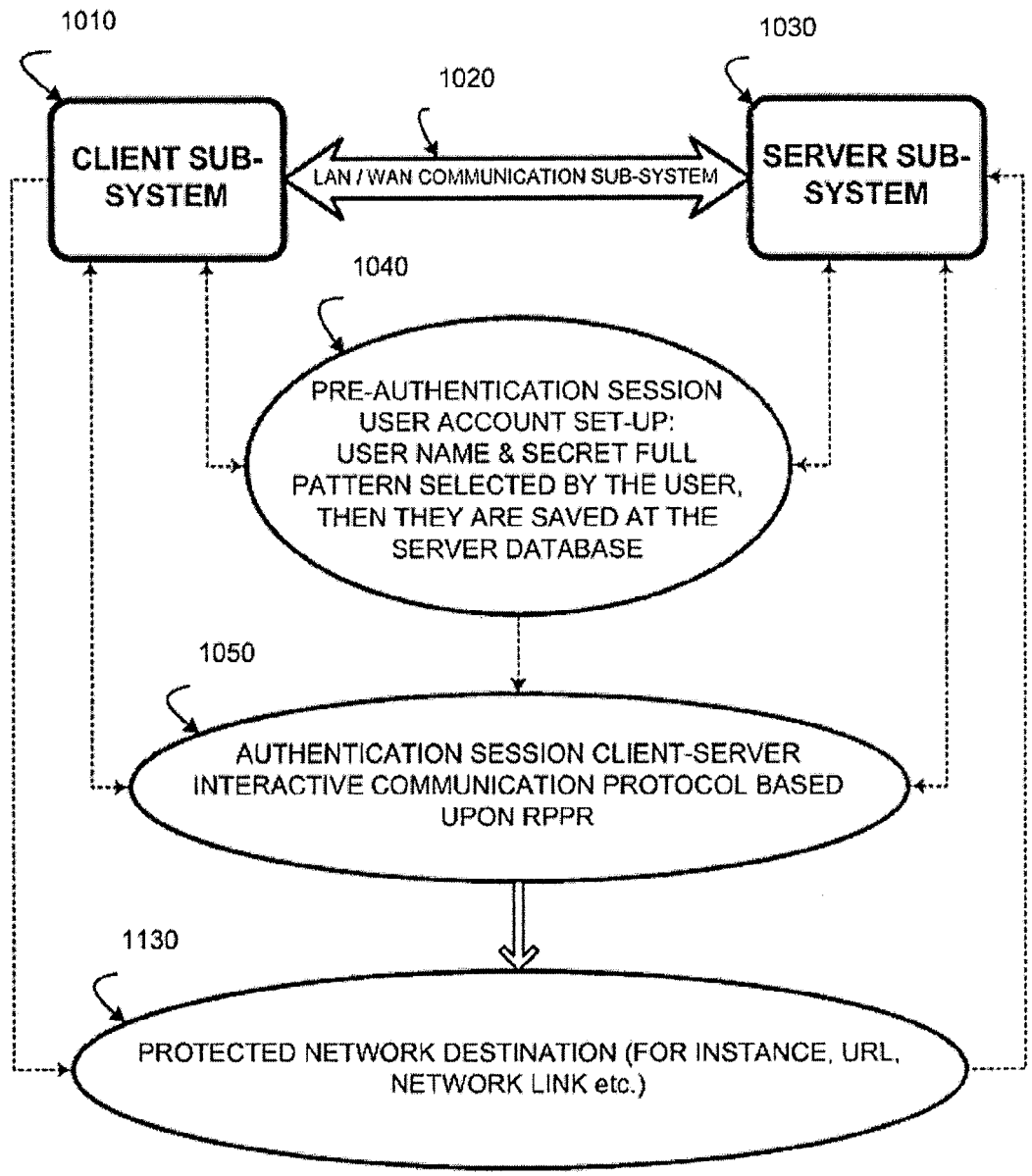
FIG. 1 illustrates client-server architecture for implementation of an authentication process according to the present invention.
Figure 2:
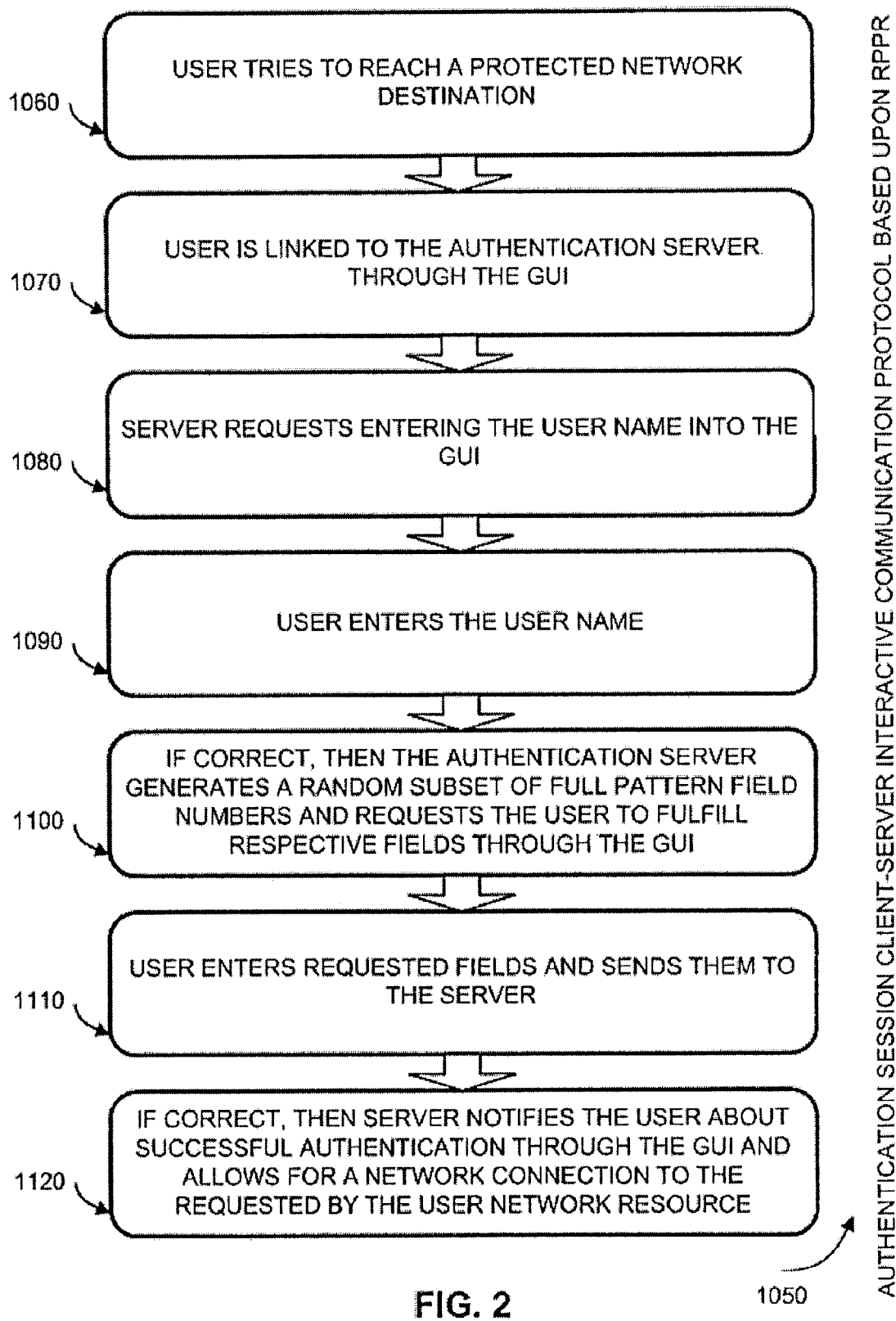
FIG. 2 is a flowchart of a basic random partial pattern recognition RPPR authentication session according to the present invention.

A detailed description of embodiments of the present invention is provided with reference to FIGS. 1 through 16. FIG. 1 illustrates a basic communication set up for RPPR authentication processes according to the present invention. A client subsystem 1010 communicates by communication media, such as a local area network or wide area network communications subsystem 1020, with a server subsystem 1030. A protected network destination 1130 controls access to resources such as secure web sites identified by URLs, links to secure networks, and the like.

To set up access, a pre-authentication session 1040 is executed by the client subsystem 1010 and server subsystem 1030. In the pre-authentication session 1040, a user account is set up in the server subsystem 1030, the user name and a secret pattern that includes an ordered set of data fields is selected by the user and stored in the server subsystem 1030. The user account information, user name and ordered set of data fields are stored in a secure server database. A more detailed description of an embodiment of an account set up session is provided with reference to FIGS. 11A-11B.

To gain access to the protected network destination 1130, the client subsystem 1010 and server subsystem 1030 execute an authentication session 1050 that includes a client-server interactive communication protocol based on RPPR. A more detailed description of an embodiment of an authentication session 1050 is provided with reference to FIG. 2.

According to one basic flow, an authentication session is initiated when the user tries to reach a protected network destination (block 1060). The protected network destination redirects the user's attempted access to the authentication server, or the attempted access is otherwise detected at the authentication server 1030. In one example, where the user is attempting access using an Internet browser, a web page is returned to the user's browser including a graphical user interface including links to the authentication server 1030 (block 1070). The web page may be returned through redirection for example, by the authentication server or another network resource. Via the graphical user interface, the server prompts the user to enter a user name into a field in the graphical user interface (block 1080). The user enters the user name, which is returned to the authentication server (block 1090). If the user name is valid, then the authentication server identifies a random subset of data fields from the ordered set of data fields associated with that user name. The user is prompted to enter field contents for the random subset of data fields using the graphical user interface (block 1100). The user inputs data for the field contents in the identified fields, and the input data are returned to the server (block 1110). If the input data matches the field contents for the random subset, then successful authentication is signaled to the user via for example the graphical user interface, signaled to the protected network destination and/or signaled to other resources, such as authorization and accounting systems, that need to know that the authentication session has succeeded, and network connection to the requested protected network destination is allowed (block 1120).

Figure 3:
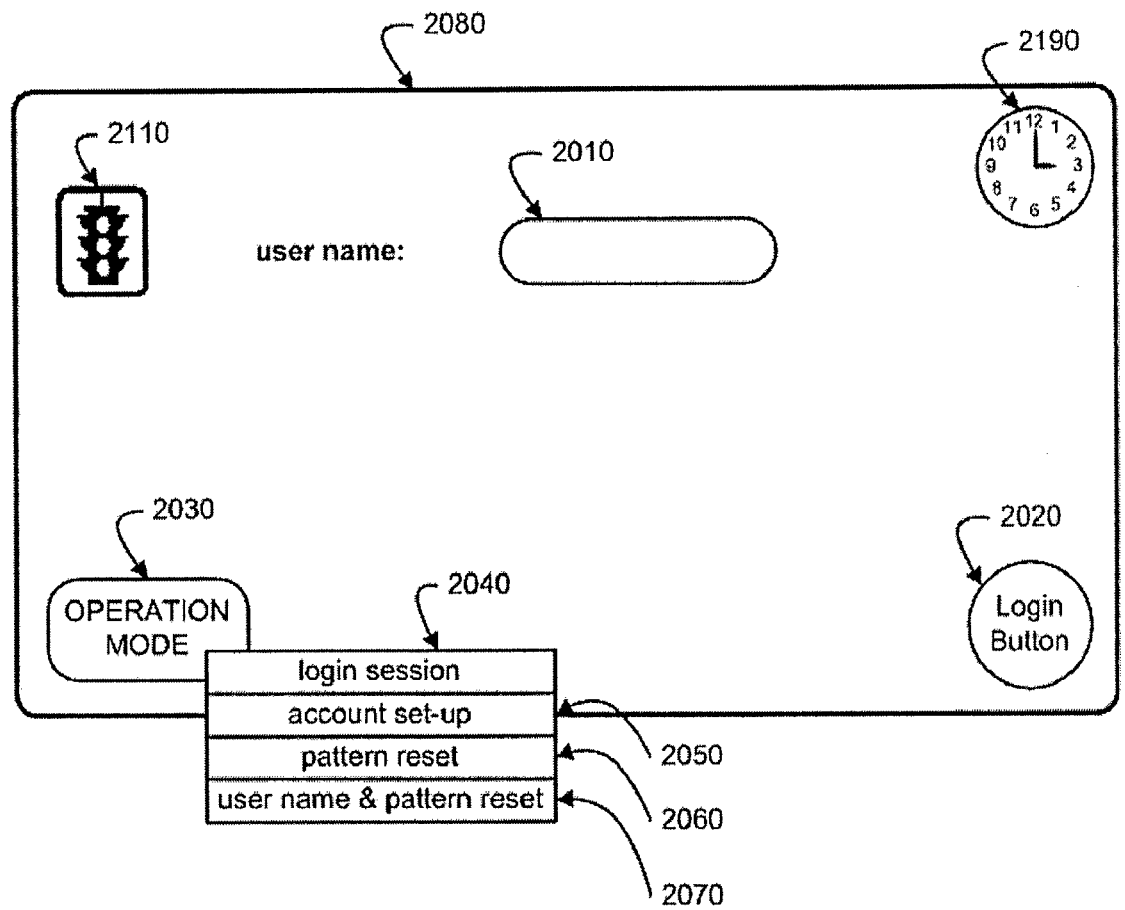
FIG. 3 illustrates a graphical user interface supporting a log-in process at the user name entry state used in one example of an authentication program according to the present invention.
Figure 4:
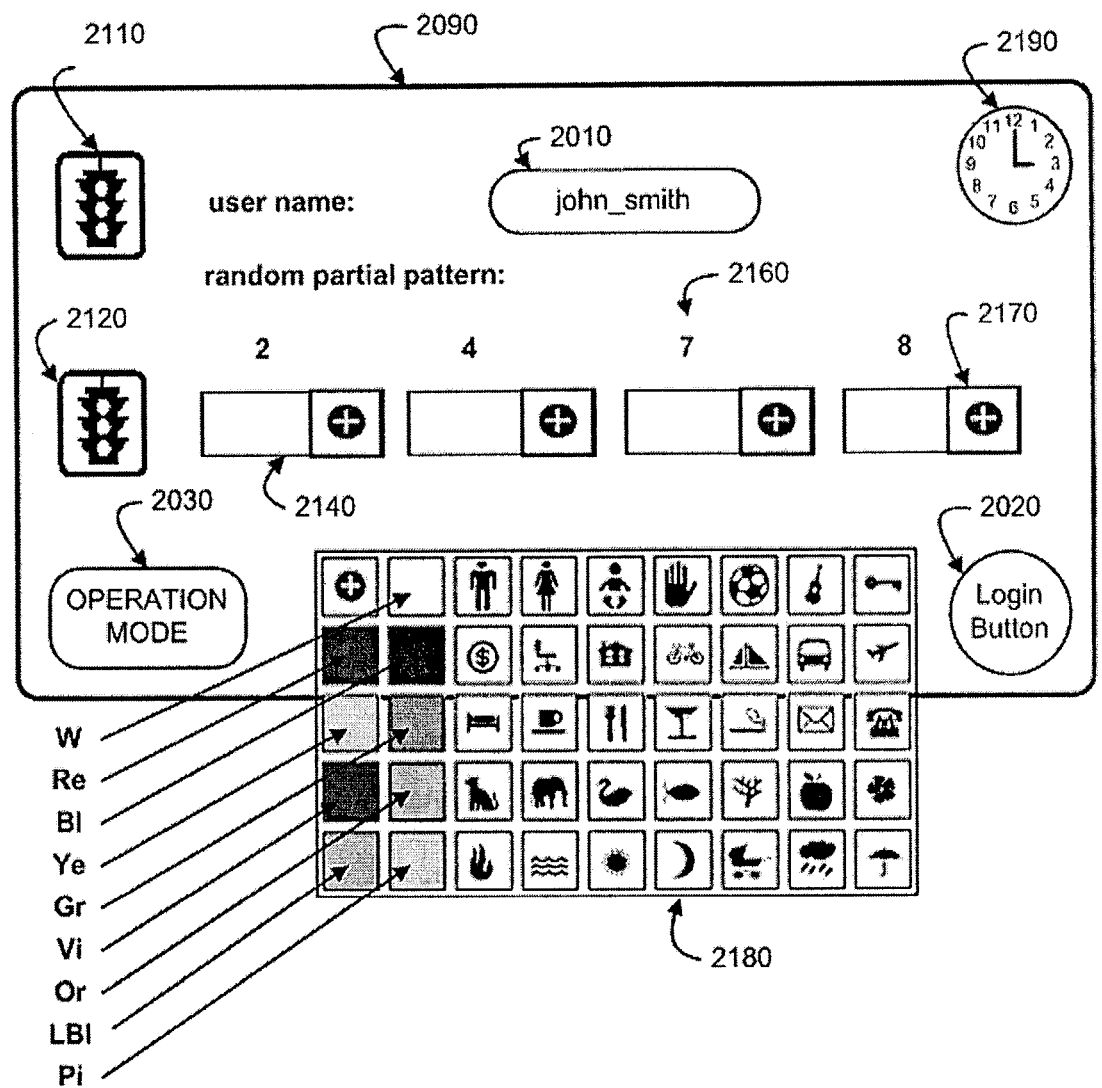
FIG. 4 illustrates a graphical user interface supporting a log-in process at the random partial pattern data entry state used in one example of an authentication program according to the present invention.
Figure 5:
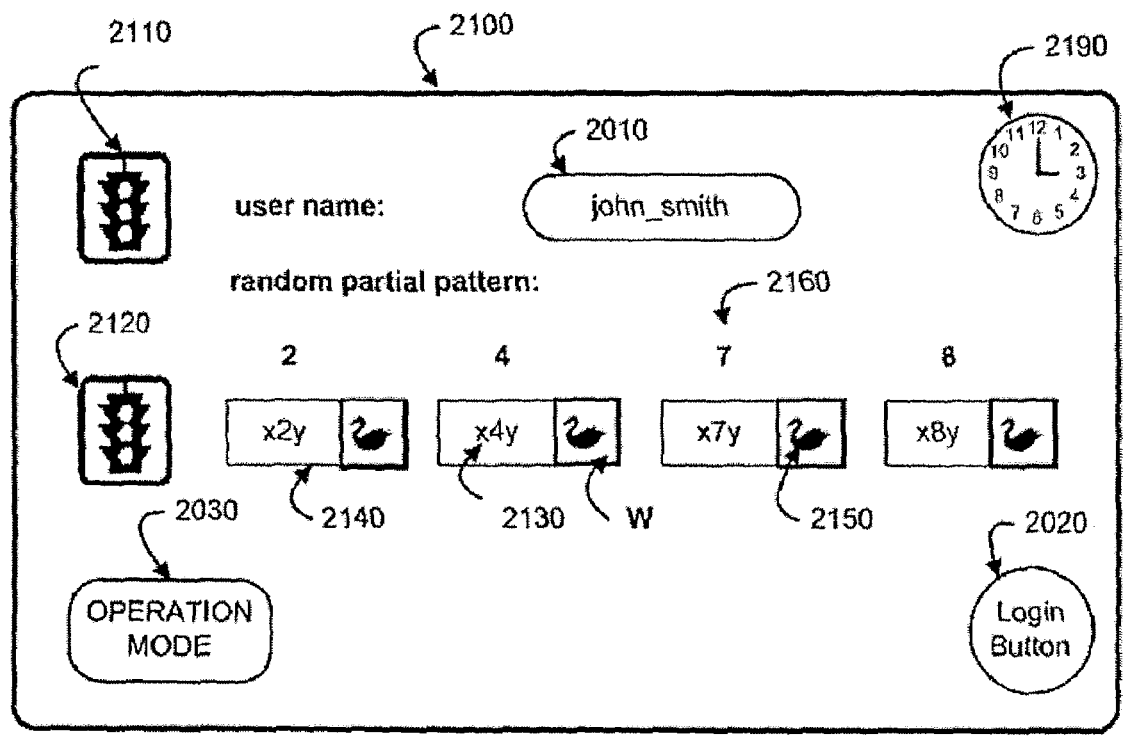
FIG. 5 illustrates a graphical user interface supporting a log-in process at the random partial pattern data entry state, in which field contents have been entered for a random subset of data fields, as used in one example of an authentication program according to the present invention.

FIGS. 3-5 illustrate input constructs based on graphical user interfaces presented using Web browsers for a log-in and authentication session based on RPPR. FIG. 3 illustrates an opening screen 2080 which is presented to the user at the beginning of an authentication session. In the opening screen 2080, data entry field 2010 is used for entry of the user name. A login button 2020 is indicated to initiate processing of field data and to start the login process. An operation mode button 2030 is included, which when indicated causes a pop-up menu of operation mode buttons, including a log-in session operation mode button 2040, an account set up operation mode button 2050, a pattern reset operation mode 2060, and an user name and pattern reset operation mode 2070. A first stoplight icon 2110 is included in the screen 2180. The stoplight icon 2110 shows red before the user name is entered, shows yellow during client/server communications, and turns green when user name is accepted. Also included in the screen 2110 is a session timer icon indicating elapsed time for the login session. The system administrator can set parameters in the server that cause reset of the login process if the timer expires, or otherwise react to timer expiry.

FIG. 4 illustrates a graphical user interface screen 2090, which is presented at the beginning of an authentication session after the user name is recognized by the server. In this example, two stoplight icons 2110, 2120 are presented. The first stoplight icon 2110 turns green after the user name has been recognized. The second stoplight icon 2120 appears during data entry for the random subset. It appears red before data has been entered into data fields, or before the log in button is indicated. The stoplight icon 2120 appears yellow during client/server communications and before acceptance of the input data representing field contents. The stoplight icon 2120 appears green to signal successful authentication.

The entered and accepted user name could be displayed in the user name field 2010, either as usual text or as sequence of echo dots for security reasons. Data entry fields (e.g. 2140) are presented for a pattern comprising a corresponding number of fields which will constitute the random subset of the ordered set of data fields stored for the user. In this example, the random subset is presented to the user by field number (e.g. 2160), and includes field number 2, field number 4, field number 7 and field number 8, out of an ordered set of for example 9 data fields. In this embodiment, associated with each of the data entry fields is a button 2170 with a corresponding window for entry of an image and color selected by the user. By indicating a button 2170, a pop-down menu 2180 of candidate colors and image icons is displayed which is used as a data entry tool for entry of the field contents for the ordered set of data fields. In this example, the pop-down menu 2180 includes a set of candidate colors, implemented in this example as background colors in the first two columns of the menu 2180 (except for the cross icon used for closing the menu), and a set of candidate image icons in the last seven columns of the menu 2180. The colors in this embodiment include W-white, Bl-blue, Gr-green, Or-orange, Pi-pink, LBl-light blue, Vi-violet, Ye-yellow, and Re-red. The user enters alphanumeric characters in a first window in the field 2140 using a keyboard or other input device, and may select an image icon and a background color in a second window as part of the field contents. In this example, the random subset includes four fields. Other numbers of fields may be used. Also, the number of fields may be varied from session to session for added security.

FIG. 5 illustrates the next screen 2100 presented to the user during the authentication session. In FIG. 5, the user has entered alphanumeric characters in the fields (e.g. 2130) and an image icon (Swan) with background color (White) in the field 2150 (the background color is indicated by the label "W" beneath the field in the drawing, but appears as the color of the background for the image icon, which is black, in the field 2150 in preferred embodiments). Other ways to include color in the field contents include providing a background color for field 2140, a color for the image icons, a color for the alphanumeric characters, and so on. A simple pattern which is a cognitive function of position in the ordered set is illustrated in this example, where the field contents for the data fields in the ordered set include the alphanumeric characters x(N)y, where (N) is a digit representing field position in ordered set, and the white Swan image icon. After entry of the input data representing field contents for the random subset, the user indicates the login button to initiate communication with server. After the server processes the input data, the authentication process is completed as described above.

The RPPR algorithm is based on a random subset of data fields from an ordered set of fields, where the field contents in some embodiments represent a pattern that is a function of position in the ordered set to facilitate user memorization. Of course, any pattern of field contents may be used, including purely random field contents, provided the client is able to recall the field contents for the random subset of the full pattern during login, as may be the case for authentication of hardware devices. A random subset that is usually less than the full ordered set is requested by the server from a client during each login/access session.

FIGS. 6-9 illustrate several methods for building patterns based on cognitive functions of position in the ordered set of data fields, which are easy to remember and operate.

Figure 6:
FIG. 6 illustrates an "object repetition method" for pattern generation according to a cognitive function of position in an ordered set of data fields.

FIG. 6 illustrates the basic Object Repetition Method (ORM). In the illustrated example, the field contains a single character "s" which is repeated for a number of times based on the field number within ordered set. Thus, the field contents of data field 1 is "s", the field contents of data field 2 is "ss", and so on until the field contents of data field 9 consists of "sssssssss". More elaborate patterns may be made in this manner.

Figure 7:
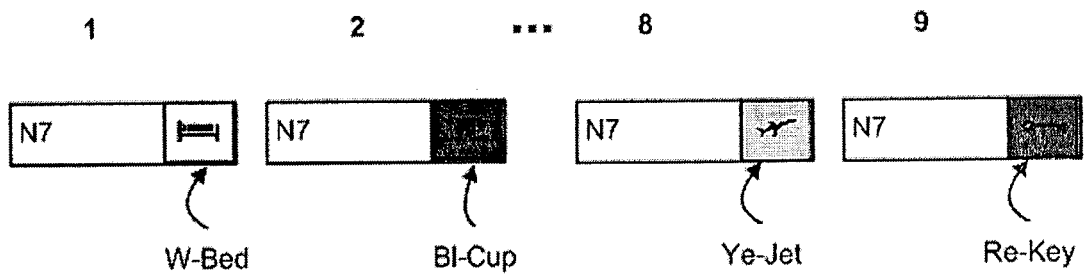
FIG. 7 illustrates a "conditional key method" for pattern generation according to a cognitive function of position in an ordered set of data fields.

Basically, the object repetition method involves selecting a relatively simple object, which is easy to remember, like
1. Any character: 1, a, . . .
2. Any simple combination of characters: 12, ab, 1a, 2b, . . .
3. Any color and one character combination: 1-Green, a-Red, . . .
4. Any one character—image/background color combination: 1-YellowBed, 2-RedDog, . . .
5. Any color and any several character combination: 12-Green, ab-Red, 1a-Green, 2b-Red, . . .
6. Any two character combination and any image/background color combination: 12-YellowBed, ab-RedDog
7. Any three character combination and any image/background color combination: 123-YellowBed, abc-RedDog Representative n-field patterns for the object repetition methods outlined above (assuming 9 fields in the full pattern): look as follows
1. 1, 11, . . . , 111111111; a, aa, aaa, . . . , aaaaaaaaa
2. 12, 1212, 121212, . . . , 121212121212121212; ab, abab, ababab, . . . , ababababababababab; 1a, 1a1a, 1a1a1a, . . . , 1a1a1a1a1a1a1a1a1a
3. 1-Green, 11-Green, 111-Green, . . . , 111111111-Green; a-Red, aa-Red, aaa-Red, . . . , aaaaaaaaa-Red
4. 1-YellowBed, 11-YelowBed, 111-YelowBed, . . . , 111111111-YellowBed; 2-RedDog, 22-RedDog, 222-RedDog, . . . , 222222222-RedDog
5. 12-Green, 1212-Green, 121212-Green, . . . , 121212121212121212-Green; ab-Red, abab-Red, ababab-Red, . . . , ababababababababab-Red; 1a-Green, 1a1a-Green, 1a1a1a-Green, . . . , 1a1a1a1a1a1a1a1a1a-Green; 2b-Red, 2b2b-Red, 2b2b2b-Red, . . . , 2b2b2b2b2b2b2b2b2b-Red
6. 12-YellowBed, 1212-YellowBed, 121212-YellowBed, . . . , 121212121212121212-YellowBed; ab-RedDog, abab-RedDog, abababRedDog, . . . , ababababababababab-RedDog
7. 123-YelowBed, 123123-YellowBed, 123123123-YellowBed, . . . , 123123123123123123123123123-YellowBed or abc-RedDog, abcabc-RedDog, abcabcabc-RedDog, . . . , abcabcabcabcabcabcabcabcabc-RedDog Another method is referred to as the Conditional Key Method (CKM) is illustrated in FIG. 7. According to the conditional key method of FIG. 7, alphanumeric character N7 is entered into data field for each position in the pattern, and a graphical icon and background color are selected according to a simple pattern. Referring to FIG. 4, the pattern begins in data field 1 with the bed image icon and a white background. Data field 2 is the coffee cup with the blue background. Data field 3 (not shown) is the knife and fork image icon with the green background. Data field 4 is the martini glass image icon with the orange background. Data field 5 is the cigarette icon with the pink background. Data field 6 is an envelope image icon with the light blue background. Data field 7 is the telephone image icon with the violet background. Data field 8 is the airplane image icon with the yellow background. Data field 9 is the key image icon with the red background. In this example, image icons are selected by traversing the row that begins with the bed icon to the right, and then at the end of the row proceeding up the last column in the set of candidate image icons in a counter-clockwise direction. The background colors are also selected by following a simple pattern in the candidate background colors, preceding down the column that begins with the white background color to the bottom of the column, and then up the column of background colors in a clockwise direction, making an easy to remember cognitive function of position in the ordered set. Other conditional key codes are based on the process of selecting a relatively simple object, like any combination of alphanumeric characters (from 1 to 3 characters) and one color from the candidate image/color menu. For instance, one could choose 123-Pink or abc-Pink. The unchanging roots here are 123 or abc, which will be kept the same in all of the n data fields (without sacrificing any generality, we are assuming 9 fields pattern sizes here). One could then use and remember Pink and its color position in the menu as a conditional key and find others, changing along with field number, either clockwise or counter-clockwise (let's choose clockwise for clarity). One could then select any combination of alphanumeric characters (from 1 to 3 characters) and one image from the candidate image icon menu, for instance, 123-Sun or abc-Sun. For example, a user could use and remember the sun image and its position as a conditional key and find others, by proceeding either clockwise or counter-clockwise (let's choose counter-clockwise for clarity). An object pattern is built based on these techniques. For instance, 123-PinkSun. As fields are changing, so are colors and images with respect to conditional keys selected in the initial object 123-PinkSun. Assuming that colors will be changing clock-wise, whereas images will be changing counter-clockwise with respect to their conditional keys (Pink and Sun) positions, representative n-field patterns look as follows (assuming 9 fields full patterns):

1. Static alphanumeric characters with conditional color: 123-Pink, 123-LightBlue, 123-Violet, 123-Yellow, 123Red, 123-White, 123-Blue, 123-Green, 123-Orange, or abc-Pink, abc-LightBlue, abc-Violet, abc-Yellow, abc-Red, abc-White, abc-Blue, abc-Green, abc-Orange
2. Static alphanumeric characters with conditional image: 123-Sun, 123-Moon, 123-Stroller, 123-Rain, 123Umbrella, 123-Flower, 123-Telephone, 123-Jet, 123-Key, 123-Giutar, or abc-Sun, abc-Moon, abc-Rain, abc-Umbrella, abc-Flower, abc-Telephone, abc-Jet, abcKey, abc-Gitar
3. Static alphanumeric characters with conditional color and conditional image: 123-PinkSun, 123-LightBlueMoon, 123-VioletStroller, 123-YellowRain, 123-RedUmbrella, 123-WhiteFlower, 123-BlueTelephone, 123-GreenJet, 123-OrangeKey It is interesting to note that an SSPR implementation would have to utilize 20-21 character static PINS or passwords (totally unrealistic case) to achieve the same level of combinatorial security, as described above methods (assuming five objects per field and four out of nine fields partial patterns (an object is any of either a alphanumeric character, or a background color, or an image icon)).

Figure 8:
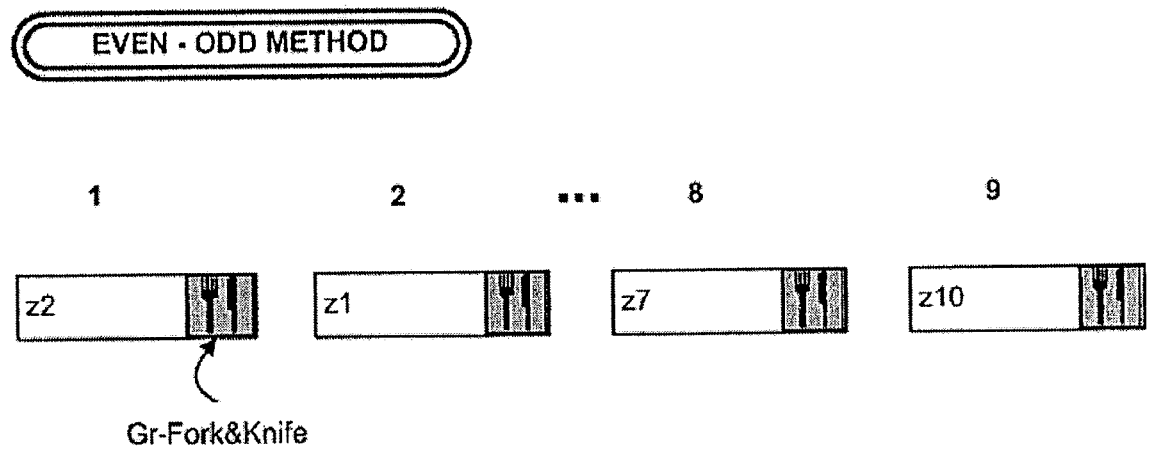
FIG. 8 illustrates a "field compliant method" for pattern generation according to a cognitive function of position in an ordered set of data fields.

FIG. 8 illustrates a basic even-odd method for defining field contents for an ordered set of data fields according to cognitive function of position in the ordered set. According to the even-odd method, the field contents for odd-numbered fields consists of the letter "z" any number equal to the field number plus 1. For even-numbered fields, the field contents consist of the letter "z" and a number equal to the field number minus 1. Thus, the field contents for data field 1 are z2. In data field 2, the field contents are z1. The pattern repeats so that in data field 8, the field contents are z7. In data field 9, the field contents are z10. According to one even-odd method, the user selects two secret algorithm meters—one for even and another one for odd fields. For example:

1. Even fields algorithm: data field 2->2+1=3, data field 4->4+1=5, etc.; Odd fields algorithm: data field 1->1-1=0, data field 3->3-1=2, etc. Eventually the pattern looks as follows: 0, 3, 2, 5, 4, 7, 6, 9, 8.
2. Even fields algorithm: 2->100-2=98, 4->100-4=96, etc. Odd fields algorithm: 1->1, 3->3, 5->5, etc. Eventually the pattern looks as follows: 1, 98, 3, 96, 5, 94, 7, 92, 9
3. Even fields algorithm: 2->2^2-2=2, 4->4^2-4=12, 6->6^2-6=30, etc. Odd fields algorithm: 1->1^2+1=2, 3->3^2+3=12, 5->5^2+5=30, etc. Eventually the pattern looks as follows: 2, 2, 12, 12, 30, 30, 56, 56, 90
4. Even fields algorithm: 2->22, 4->44, etc. Odd fields algorithm: 1->11111, 3->33333, etc. Eventually the pattern looks as follows: 11111, 22, 33333, 44, 55555, 66, 77777, 88, 99999

The Even-Odd Method (EOM) could be easily combined with other functions of position, such as ORM and CKM. For instance, even fields algorithm: 2->222-White (conditional key; clockwise), 4->444-Green, 6->666-Pink, etc.; odd fields algorithm: 1->111-Umbrella (conditional key, counter-clockwise), 3->333-Stroller, 5->555-Sun, etc. Eventually the pattern looks as follows: 111-Umbrella, 222-White, 333-Stroler, 444-Green, 555-Sun, 666-Pink, 777-Flame, 888-Violet, 999-Bed.

Figure 9:
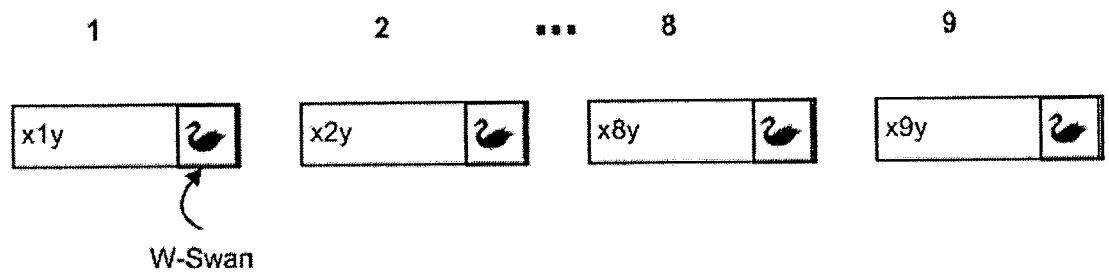
FIG. 9 illustrates an "even-odd method" for pattern generation according to a cognitive function of position in an ordered set of data fields.

FIG. 9 illustrates the basic Field Compliant Method (FCM) for assigning a cognitive function of position in the development of the field contents for the ordered set of data fields which constitutes the authentication codes. This can be seen in FIG. 9, the field contents for the data fields consists of x(N)y with a black swan on white background. The parameter (N) represents the field number. Thus, data field 1 includes the field contents x1y-WhiteSwan. Data field 2 includes the field contents x2y-WhiteSwan. The pattern repeats so that the data field 8 includes the field contents x8y-WhiteSwan and the data field 9 includes the field contents x9y-WhiteSwan.

Basically, FCM is based on selecting an object consisting of any combination of characters, colors and/or images to be a root object for all fields. Embed into this object a meter, changing in a strict correspondence to the field sequential number according to a certain secret algorithm. For instance, 1. Root: ab-White. Meter—a number before "ab" corresponding to a field number: 1ab-White, 2ab-White, 3ab-White, . . . , 9ab-White
2. Root: ab-White. Meter—a number after "ab" corresponding to a field number: ab1-White, ab2-White, ab3-White, . . . , ab9-White
3. Root: ab-White. Meter—a number embedded between "a" and "b" corresponding to a field number: a1b-White, a2b-White, a3b,-White, . . . , a9b-White
4. Root: ab-White. Meter—a number before "ab" corresponding to a field number plus 100: 101ab-White, 102ab-White, 103ab-White, . . . , 109ab-White
5. Root: ab-White. Meter—a number after "ab" corresponding to a field number plus 100: ab101-White, ab102-White, ab103-White, . . . , ab109-White
6. Root: ab-White. Meter—a number between "a" and "b" corresponding to a field number plus 100: a101b-White, a102b-White, a103b-White, . . . , a109b-White
7. Root: ab-White. Meter—a number before "ab" corresponding to a field number multiplied by 2: 2ab-White, 4ab-White, 6ab-White, . . . , 18ab-White
8. Root: ab-White. Meter—a number after "ab" corresponding to a field number multiplied by 2: ab2-White, ab4-White, ab6-White, . . . , ab 18-White
9. Root: ab-White. Meter—a number between "a" and "b" corresponding to a field number multiplied by 2: a2b-White, a4b-White, a6b-White, . . . , a18b-White
10. Root: ab. Meter—a color found from the conditional key (White) clockwise in correspondence to the field number: ab-White, ab-Blue, ab-Green, ab-Orange, ab-Pink, ab-LightBlue, ab-Violet, ab-Yellow, ab-Red
11. Root: ab-White. Meter—an image found from the conditional key (Key) counter-clockwise in correspondence with the field number multiplied by 2: ab-WhiteGuitar, ab-WhiteArm, ab-WhiteGirl, ab-WhiteDollar, ab-WhiteDog, ab-WhiteSee, ab-WhiteMoon, ab-WhiteRain, ab-WhiteFlower
12. Root: Z. Meter—field number before "Z" and behind "Z": oneZone, twoZtwo, threeZthree, . . . , nineZninc.

These patterns are as easy to remember as 4 character PINs/passwords. However, the combinatorial security is a great deal of stronger for the RPPR based technology, as compared with SSPR algorithm based security systems.

Figure 10:
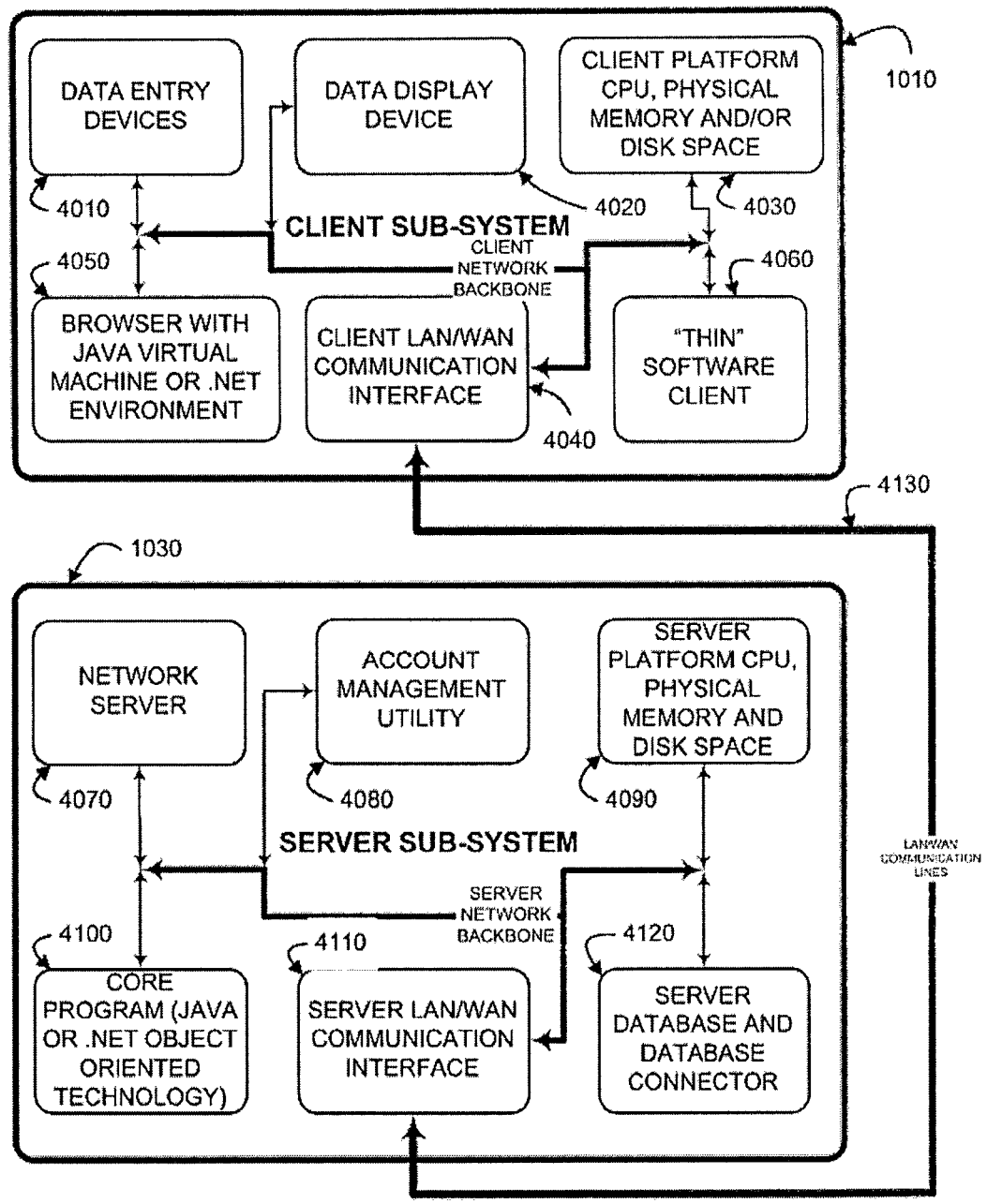
FIG. 10 is a basic architecture diagram for an embodiment of a client-server system according to the present invention, including support for the RPPR authentication process.

FIG. 10 illustrates a client/server system including authentication resources according to the present invention. The client subsystem 1010 includes data entry devices 4010 (keyboard, mouse, voice input, etc.), a display device 4020 (CRT, LCD panel, etc.), and a physical platform 4030 (personal computer, hand held computer, internet appliance, etc.) including a processing unit, memory, and other data processing resources. Software running in the client includes a browser 4050 or a "thin" software client 4060 such as may be provided on personal digital assistants, cell phones, and other simple internet appliances which may not support full browser functionality. The browser 4050 includes Java Virtual Machine or a .NET environment which supports the client-server dialog. Likewise, the "thin" software client 4060 may support the client-server dialog. Finally, an interface 4040 to the network communication media 4130 is provided. The communication media 4130 may be a private or pubic, local area network or a wide area network using wired, wireless or optical media in representative systems.

The server subsystem 1030 includes network server resources 4070, an account management utility 4080 for the user accounts subject of the authentication process, and a platform 4090 including a processing unit, memory, disk space and other data processing resources. A core program 4100 supporting the authentication process is included in the server subsystem 1030. The core program may be implemented using Java or .NET object-oriented technology for examples. Also, a server database and database connector 4120 is included. Finally, an interface 4110 to communication media for server LAN/WAN communication lines 4130 is provided. In some embodiments, the server and server data are implemented with security features to protect user account information files from intruders.

Figure 11A:
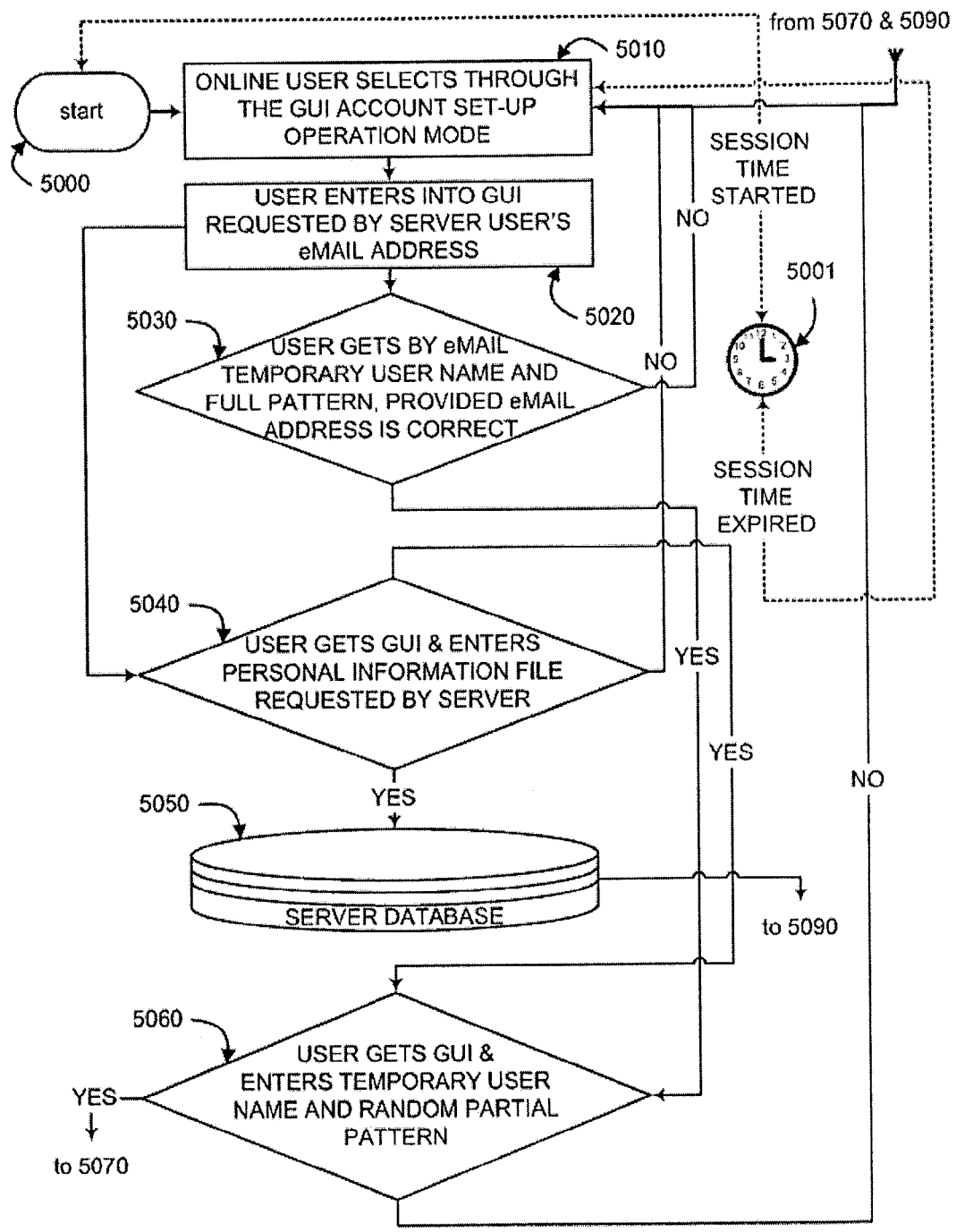
FIGS. 11A-11B provide a process flowchart for online user account set up in support of the RPPR authentication process according to the present invention.
Figure 11B:
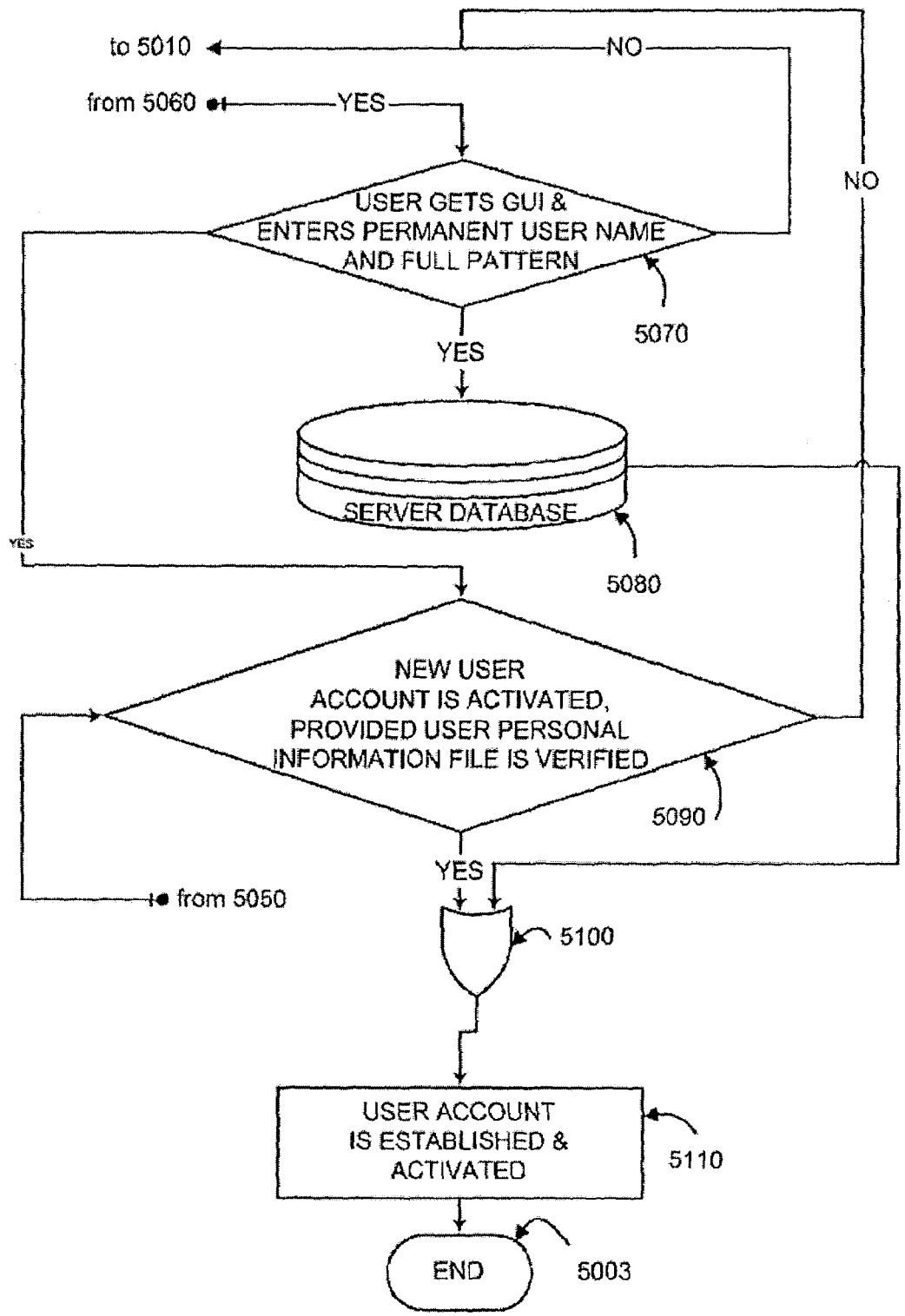
Figure 12:
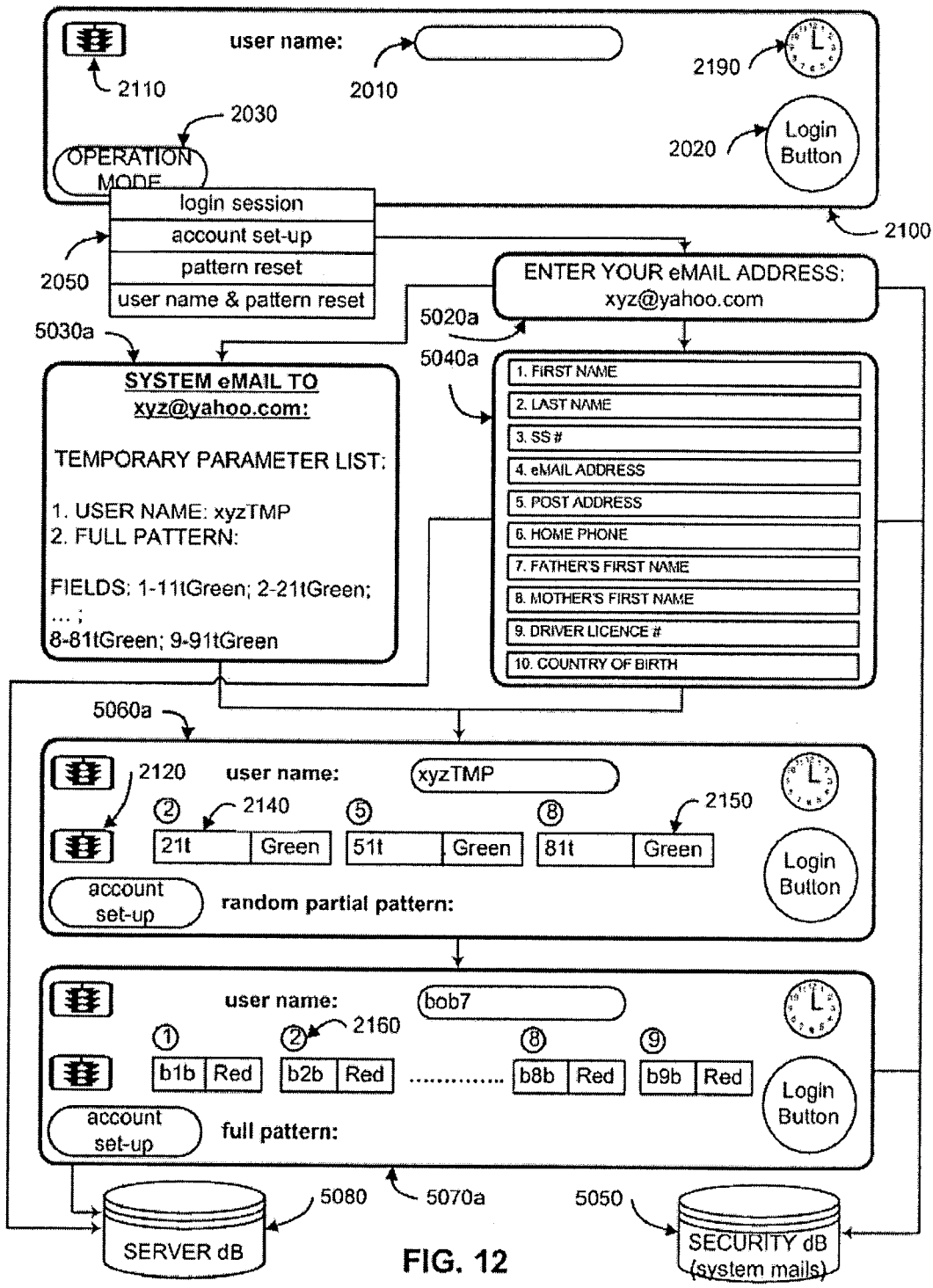
FIG. 12 provides a process block diagram for online user account set up in support of an RPPR authentication process according to the present invention.

FIGS. 11A and 11B illustrate one example online user account set up process flow, which operates without human intervention on the server side in some embodiments. FIG. 12 illustrates an example progression of user interface information for the process of FIGS. 11A and 11B. In FIG. 11A, the process starts at block 5000 and a session timer 5001 is started. Block 2100 of FIG. 12 is displayed to the user, which comprises an opening screen like screen 2080 of FIG. 3, including a stoplight icon 2110. The online user first selects the account set up operation mode 2050, using a graphical user interface like operation mode button 2030 with pop down menu, (block 5010). The system then presents an interface like screen 5020a, and user enters into a field of the graphical user interface the user's e-mail address (block 5020). Next, the user gets an e-mail message from the server having a temporary user name and a full pattern for use during account set up in an interface 5030a, provided the e-mail address input by the user exists and is allowed by security software in the server (block 5030). If the e-mail address does not exist, is incorrect, or is not allowed, then the process resets to block 5010. Likewise, if the session timer 5001 expires, then the process resets to block 5010. In an alternative flow, such as when the user's e-mail address is correct and accepted, then a second graphical user interface 5040a is presented allowing the user to enter personal information to create a personal information file (stored in the server side database—block 5080) supporting the authentication process (block 5040). Once the personal information file has been created, it is sent to the server database and verified by a human resources department, or otherwise, in some systems (block 5090). In addition, the event is logged by a system message to its a security database 5050. If the personal file is not entered, or is entered incorrectly, then the process resets to block 5010.

Also, after receiving the temporary user name and full pattern at block 5030, and in some embodiments, after the personal information file is successfully entered at block 5040, then the user is presented another graphical user interface 5060a including a second stoplight icon 2120, for entry of the temporary user name and random partial pattern requested by the server, based upon the full pattern provided at block 5030 (block 5060). The second stoplight icon 2120 starts with a red light, and progresses to a yellow light during communication with the server. If the user fails entry of the user name and partial pattern requested at block 5060, then the process resets to block 5010. If the user successfully enters the temporary user name and the partial pattern requested at block 5060, then the process branches to block 5070 in FIG. 11B, and the second stoplight icon progresses to green. At block 5070, the user gets another graphical user interface 5070a for entry of a permanent user name and full pattern (block 5070). The second stoplight icon may be reset to red, and used to indicate progress of the mode, or an additional stoplight icon may be displayed. The full pattern is chosen by the user in some embodiments according to a cognitive function of position in the ordered set of data fields as described above. The user's permanent user name and full pattern are sent to the server database 5080. Alternatively, a new user account is activated based on the user name and its full pattern, provided the user personal information file received from block 5050 of FIG. 11A is verified (block 5090). Either after the account verification at block 5090, or after entry of the permanent user name and pattern at block 5080, the user account is established and activated (block 5110). The process flow ends after user account activation (block 5003).

Figure 13:
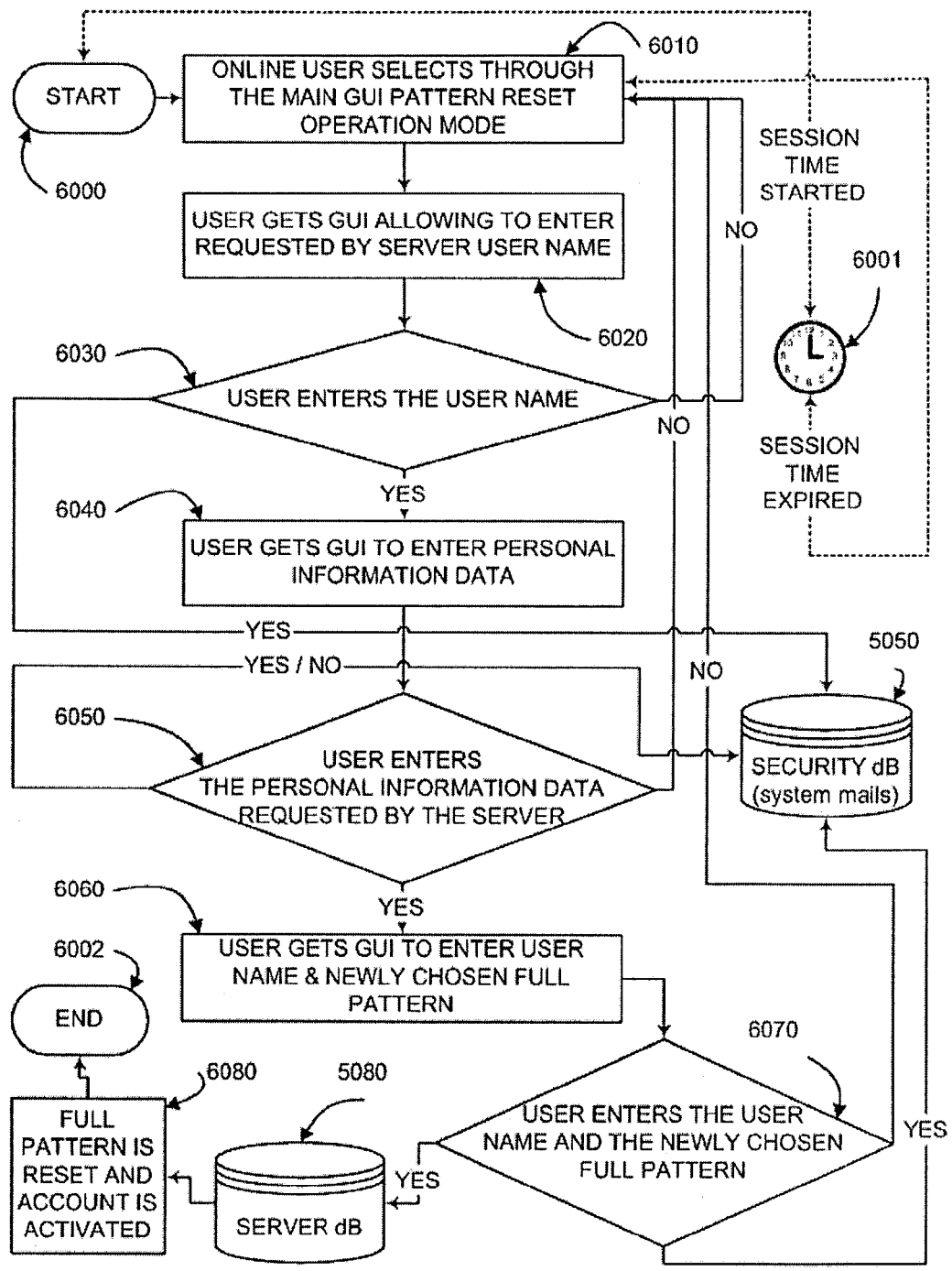
FIG. 13 provides a process flowchart for online user full pattern reset in support of an RPPR authentication process according to the present invention.
Figure 14:
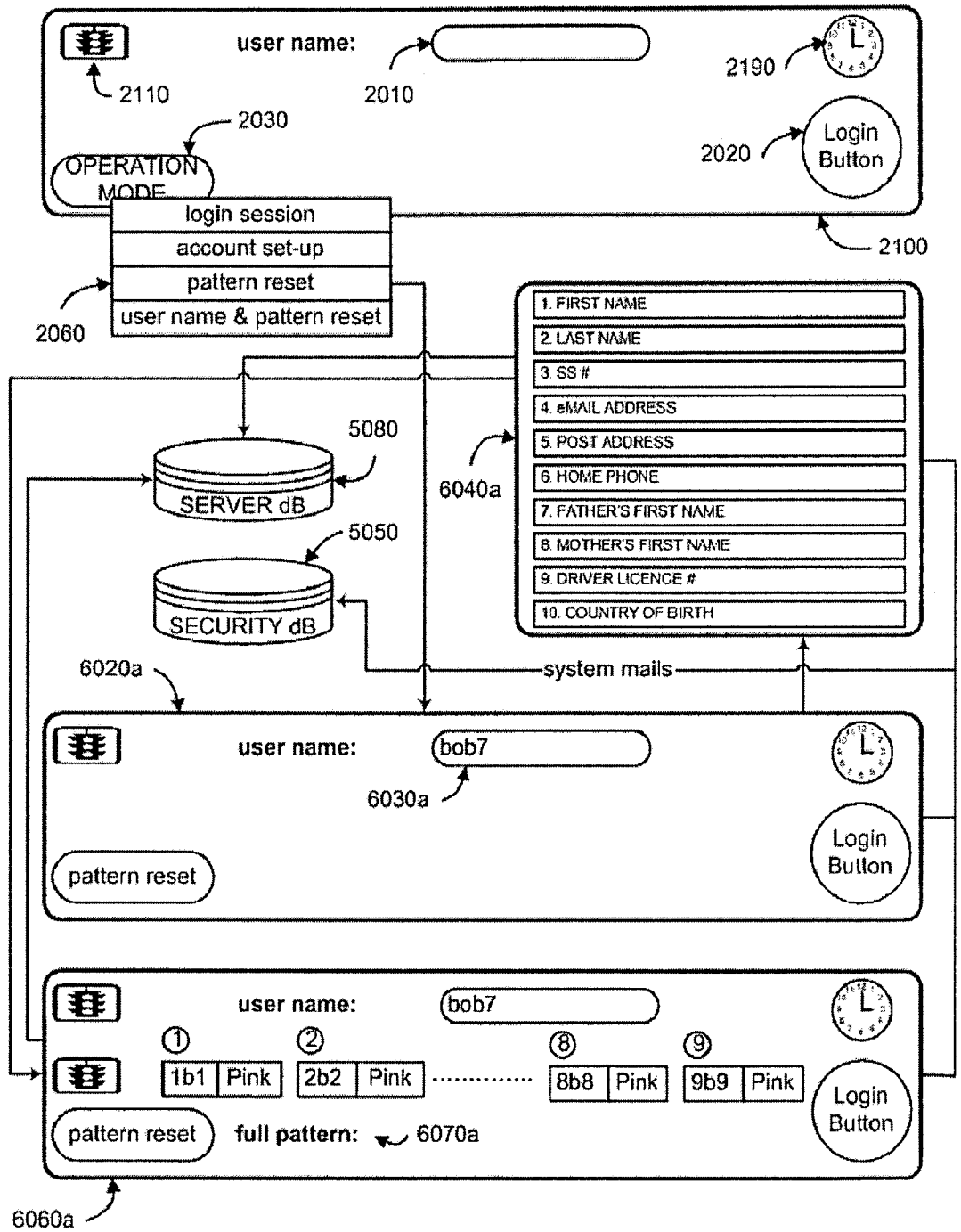
FIG. 14 provides a process block diagram for online user full pattern reset in support of the RPPR authentication process according to the present invention.

FIG. 13 illustrates one example of pattern reset process flow for a reset mode of operation in the authentication system, which operates without human intervention on the server side in some embodiments. FIG. 14 illustrates an example progression of user interface information for the process of FIG. 13. The process starts at block 6000 with a display of the interface screen 2100, like the screen of FIG. 3. The online user selects an operation mode with the operation mode button 2030 and pull down menu. In this example, the pattern reset operation mode 2060 is selected (block 6010). In the next step, the screen 6020a is displayed allowing the user to enter a user name as requested by the server (block 6020). The user then enters the user name. If the user name is not accepted, then the process resets to block 6010. If the user name is accepted, then the server presents the user with a user interface screen 6040a prompting entry of personal information data (block 6040). Also, if the user name is accepted, then a system message is sent, logging the event in the security database 5050. Next, the user enters the personal information as requested by the server (block 6050). If the personal information is entered and accepted, then a system message is sent, logging the event in the security database 5050. If the personal information is not entered, or not accepted, then the process resets to block 6010, and a system message is sent logging the failure of the process in the security database 5050. If the personal information is entered and accepted, then the server presents a graphical user interface 6060a to the user for entry of a newly chosen full pattern (block 6060). With the interface 6060a, the user enters the user name and a newly chosen full pattern (6070). If the data is not entered, or not accepted, then the process resets to block 6010. If the user name and newly chosen full pattern are accepted, then a system message such as a system e-mail, is sent and the event is stored in a security database 5050 logging the event. Also, if the user name and newly chosen full pattern are accepted at block 6070, then the new pattern is stored in the server database 5080, the full pattern is reset and account is activated (block 6080). Finally the process is complete (block 6002). Activity related to pattern reset can be monitored using the security database 5050 to detect unusual behavior, and provide additional levels of security. During the pattern reset mode, session timer 6001 monitors elapsed time for the session, and optionally for each step in the session. If the timer expires, then the process resets to block 6010.

Figure 15:
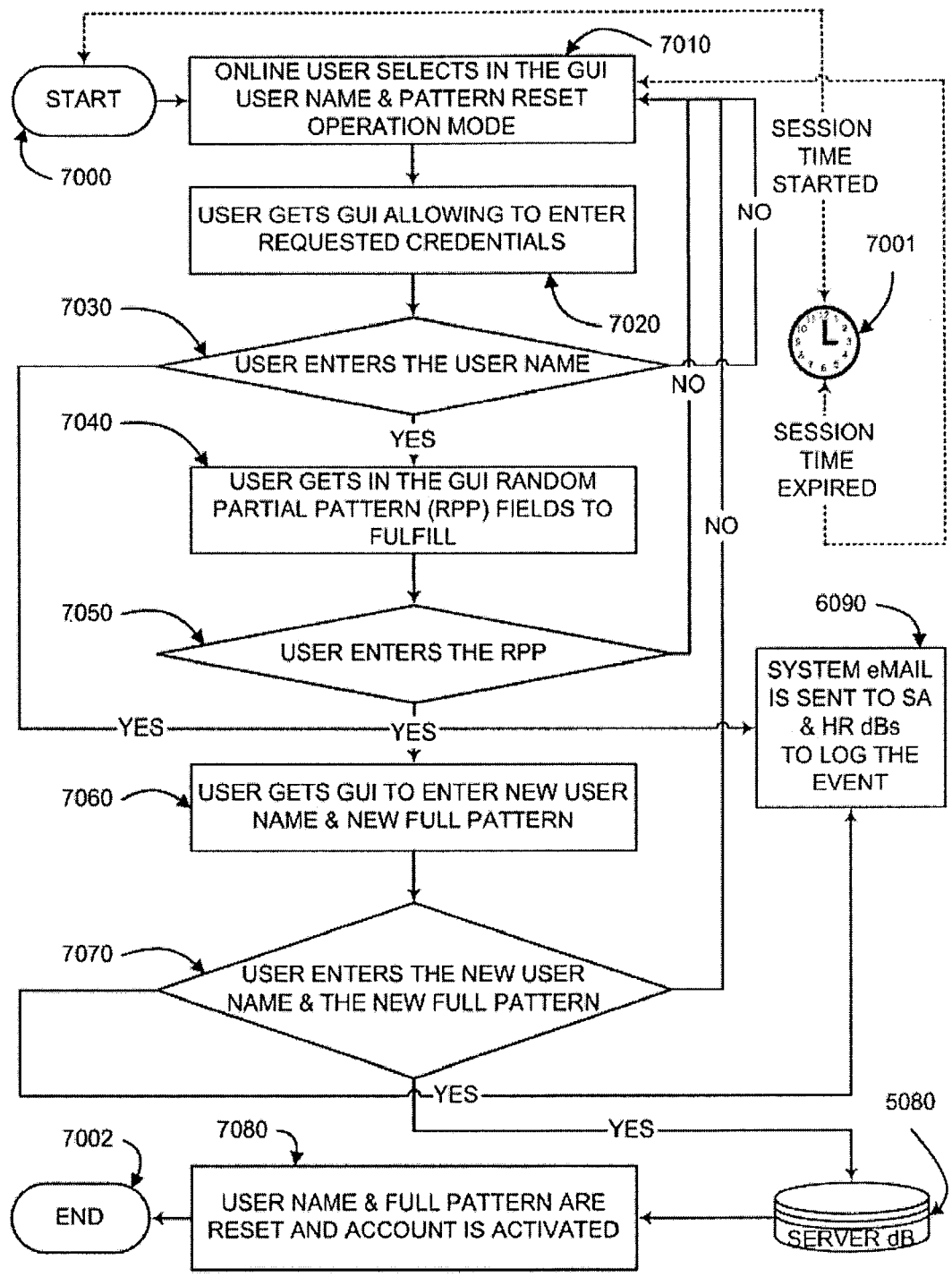
FIG. 15 provides a process flowchart for online user name and full pattern reset in support of an RPPR authentication process according to the present invention.
Figure 16:
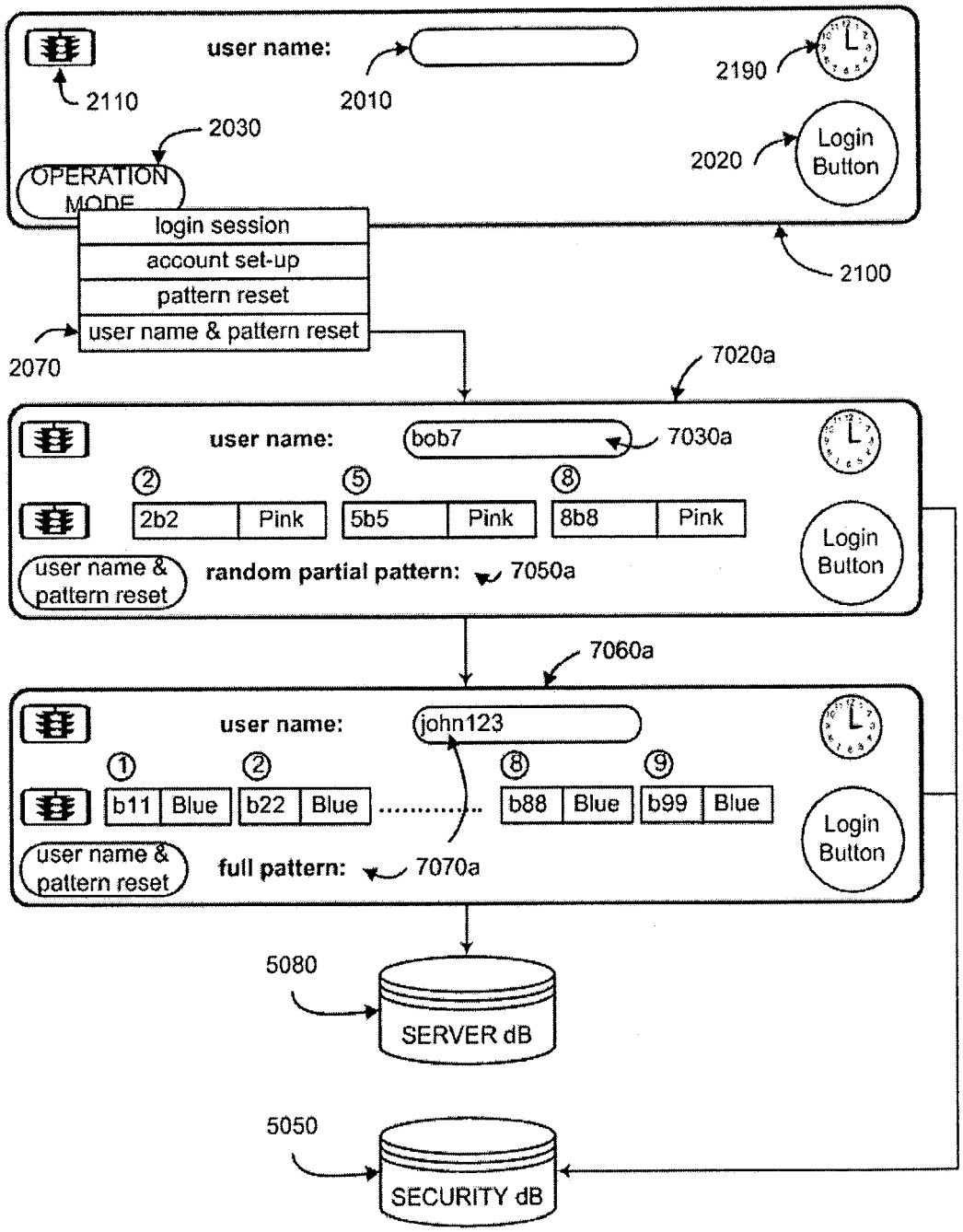
FIG. 16 provides a process block diagram for online user name and full pattern reset in support of an RPPR authentication process according to the present invention.

FIG. 15 illustrates one example user name and pattern reset process flow for a mode of operation in the authentication system, which operates without human intervention on the server side in some embodiments. FIG. 16 illustrates an example progression of user interface information for the process of FIG. 15. The process starts at block 7000 with a display of the interface screen 2100, like the screen of FIG. 3. The online user selects an operation mode with the operation mode button 2030 and pull down menu. In this example, the user name and pattern reset operation mode 2070 is selected (block 7010). Next, the user is presented the user interface, such as screen 7020a (perhaps without the partial pattern fields at this time), prompting entry of requested credentials (block 7020). The user enters a user name in the field 7030a (block 7030). If the user name is not entered or not accepted, then the process resets to block 7010. If the user name is entered and accepted, screen 7020a is updated presenting the random partial pattern fields 7050a for fulfillment (block 7040). The user enters the random partial pattern in the fields 7050a (block 7050). If the random partial pattern is not accepted, then the process resets to block 7010. If the random partial pattern is accepted, then the user is presented a user interface, such as interface 7060a, for entry of a newly chosen user name and newly chosen full pattern (block 7060). Next, the user enters the new user name and new full pattern (block 7070). If the new user name and new full pattern are not accepted, then the process resets to block 7010. If the new user name and new full pattern are accepted, then they are stored in the server database 5080. Once stored, the user name and full pattern are reset and the account is activated (block 7080). Finally, the process ends (block 7020).

During the user name and pattern reset mode, events, including entry of the user name and entry of the random partial pattern at blocks 7030 and 7050 are logged in the security database by system messages. Likewise, entry of the new user name and new full pattern at block 7070 are logged by system messages in the security database 5050. Activity related to the user name and pattern reset mode can be monitored using the security database 5050 to detect unusual behavior, and provide additional levels of security. During the user name and pattern reset mode, session timer 7001 monitors elapsed time for the session, and optionally for each step in the session. If the timer expires, then the process resets to block 6010.

The security database 5050 can be used to detect hacker attempts, to detect logic errors in the system, to detect database errors, and to detect and analyze usage of the account set up system. Various patterns of system messages within a single session for a give client, and within groups of sessions can be analyzed to indicate particular events and behaviors. For example, a system message signaling a failure in a data entry step, such as at step 6050 in FIG. 13, which is not followed by a system message logging success at the same data entry step within a reasonable time interval, may manifest a hacker attempt. Also, the security database 5050 can be used for system performance monitoring and fine tuning. For example, the session timer can be adjusted to account for variations in network latency across account holders, who may be located around the world.

In various embodiments, the present RPPR system is used for user authentication in a client-server network architecture, for authentication of hardware devices (where the clients comprise peer routers for example) and in other environments supporting interactive authentication sessions. Interactive authentication based on the Random Partial Pattern Recognition (RPPR) algorithm provides significant security protection against multiple known intruder attacks. The interactive, multi-field pattern process of the present invention, such as the RPPR establishes a new paradigm, replacing standard static password technology. By capitalizing on modern high clock rate client-server CPU processing power and high network throughput, the RPPR process is easy to use. In the examples described above, user authentication begins with a client's initial request to a protected network destination. Then, the server, having known the client's user name, prompts the client through the client's GUI to fulfill a subset of the user's full pattern randomly selected by the server. Each field in the random subset requested from the client is associated with a displayed sequence number corresponding to a position in the full pattern. Each field in the GUI allows entering any combination of objects (at least one object per field is to be entered). In the example presented with reference to FIGS. 3-5, the objects entered in the field may be any number of alphanumeric characters, one image icon and one color background icon from a pop-down field menu fixed selection. The full pattern is a pre-set shared secret between the client and the server established during the client account set-up. The full pattern resides in the database on the server side. Upon receiving the client's response, the server compares internally computed expected combination with the client's input data, and makes a no/go authentication decision, provided the response is false/true.

For hardware devices, RPPR authentication is a significant communication line security enhancement over the commonly used Challenge Handshake Authentication Protocol (CHAP). The device-authenticator works as a server, while the device, being authenticated, plays a client role. Both devices have a secret (password like) key. According to RPPR, the authenticator generates a random subset of full pattern field sequence numbers and sends this request to the client device. The full pattern fields contain only alphanumeric characters in some embodiments (each field may contain any number of characters, unless it is restricted by the hardware protocol, but at least one character per field). However, the number of full pattern fields and their subset are not restricted by the human memory and/or human processing time and can be a great deal higher than in a user authentication case. Therefore, RPPR allows for scalable security on the communication lines during authentication of hardware devices (for instance, router to router authentication). The client device fulfills the requested fields. Then, it encrypts the response with its secret (password like) key and sends the response to the host (the device-authenticator). The host compares internally computed expected combination with the client's one, and makes a no/go authentication decision, provided the response is false/true.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A system for authentication of a client, comprising:
   a data processor including an interface to a database, an interface to a data network, and authentication system programs executable by the data processor, the database including records of client accounts, the record of a client account in the database holding client credentials, the client credentials including an account user name, client profile data and a shared-secret account authentication code comprising field contents arranged in an ordered set of data fields, the data fields in the ordered set having enumerated positions, and the field contents being arranged in the enumerated positions in accordance with a full pattern chosen by the client, and the system programs including, authentication logic supporting an authentication algorithm for authentication of a client based upon comparing client credentials including an account user name and an entry based on said account authentication code entered during an authentication session with client credentials stored in advance in the record of a client account, and system logic supporting client account administration for the authentication algorithm, the client account administration including at least one mode of operation that presents an interface to a client via the data network having at least a first tier of security requiring entry of one of the account user name and an email address, and a second tier of security, the system logic supporting the second tier including resources for generating an authentication challenge that identifies enumerated positions of a random subset of the ordered set of data fields, for receiving an authentication response from the client, for matching the authentication response with a part of the full pattern including the field contents from the random subset of the ordered set of data fields, and for making an authentication decision based on matching said part of the full pattern, wherein the random subset includes fewer data fields than all of the data fields in the ordered set.

2. The system of claim 1, wherein said at least one mode of operation comprises an account set up mode, and wherein said interface presented to the client includes a first graphical construct prompting entry of an email address;

a second graphical construct prompting entry of client profile data;

an automatic system message, issued in response to acceptance of an email address and client profile data entered in response to the prompting, to the client using said email address carrying server generated temporary client credentials, including a temporary user name and a temporary authentication code including field contents arranged in an ordered set of data fields, for the authentication algorithm;

a third graphical construct supporting the authentication challenge and authentication response by prompting entry of said temporary user name and field contents of a random subset of said ordered set of data fields of said temporary client credentials; and a fourth graphical construct, presented on acceptance of said temporary client credentials via said third graphical construct, prompting entry of client credentials, including the account user name and field contents arranged in the ordered set of data fields in accordance with a full pattern chosen by the client of the account authentication code, for use in the authentication algorithm.

3. The system of claim 1, wherein said at least one mode of operation comprises an account authentication code reset mode for an account, and wherein said interface presented to the client includes a first graphical construct prompting entry of said account user name;

a second graphical construct prompting entry of client profile data;

a third graphical construct, presented on acceptance of an account user name and client profile data entered in response to the prompting via said first and second graphical constructs, prompting entry of new field contents arranged in the ordered set of data fields in accordance with a full pattern chosen by the client for the account authentication code for use in the authentication algorithm.

4. The system of claim 1, wherein said at least one mode of operation comprises a client credential reset mode for an account, and wherein said interface presented to the client includes a first graphical construct supporting the authentication challenge and authentication response by prompting the client for said account user name and for an authentication response, including identifying the enumerated positions of a random subset of said ordered set of data fields of said account authentication code; and a second graphical construct, presented on acceptance of an account user name and an authentication response entered in response to the prompting via said first graphical construct, prompting entry of a new client credential, including a new account user name and new field contents arranged in the ordered set of data fields in accordance with a full pattern chosen by the client, for use in the authentication algorithm.

5. The system of claim 1, wherein said system logic includes a program which logs events related to account administration in a security database.

6. The system of claim 1, wherein said system logic supporting client account administration comprises routines supporting on-line account administration without human intervention.

7. The system of claim 1, wherein said at least one mode of operation comprises a plurality of modes, including an account set up mode in which a client establishes client credentials for a record of a client account in the database, the client credentials including an account user name and field contents arranged in the ordered set of data fields in accordance with a full pattern chosen by the client, an account client credential reset mode for an account in which the client changes both the account user name and the field contents arranged in the ordered set of data fields, and an account authentication code reset mode in which the client changes only the field contents arranged in the ordered set of data fields.

8. The system of claim 1, wherein said at least one mode of operation comprises a plurality of modes, including an account set up mode in which a client establishes client credentials for a record of a client account in the database, the client credentials including an account user name and field contents arranged in the ordered set of data fields in accordance with a full pattern chosen by the client, an account client credential reset mode for an account in which the client changes both the account user name and the field contents arranged in the ordered set of data fields ordered set of data fields, and an account authentication code reset mode in which the client changes only the field contents arranged in the ordered set of data fields ordered set of data fields, and wherein said system logic includes a program which logs events related to account administration in a security database for said plurality of modes.

9. The system of claim 1, wherein said at least one mode of operation comprises a plurality of modes, including an account set up mode in which a client establishes client credentials for a record of a client account in the database, the client credentials including an account user name and field contents arranged in an ordered set of data fields in accordance with a full pattern chosen by the client, an account client credential reset mode for an account in which the client changes both the account user name and the field contents of the ordered set of data fields, and an account authentication code reset mode in which the client changes only the field contents of the ordered set of data fields, and wherein said system logic supporting client account administration comprises routines supporting on-line account administration without human intervention for said plurality of modes.

10. A method for authentication of a client, comprising:
storing records of client accounts holding client credentials, including an account user name, an account authentication code and client profile data, in a database for a "what user knows" authentication algorithm based upon comparing client credentials entered during an authentication session with client credentials stored in advance in the record of a client account, the account authentication code comprising field contents arranged in an ordered set of data fields in accordance with a cognitive arrangement chosen by the client, the ordered set being stored in said database;
presenting to a client via a data network, an account administration menu for the authentication algorithm, the account administration menu prompting selection of at least one mode of operation;
in response to input selecting one of said modes of operation for set up or modification of said account client credentials, presenting an interface to the client via the data network having at least a first tier of security requiring entry of one of the account user name and an email address, and a second tier of security, the second tier including generating an authentication challenge that identifies enumerated positions of a random subset of the ordered set of data fields, receiving an authentication response from the client, matching the authentication response with a part of the full pattern including the field contents from the random subset of the ordered set of data fields, wherein the random subset includes fewer data fields than all of the data fields in the ordered set; and
accepting and storing data in said database modifying said account client credentials if said at least two tiers of security are successfully traversed.

11. The method of claim 10, wherein said at least one mode of operation comprises an account set up mode, and wherein presenting said interface includes
prompting the client for entry of an email address;
prompting the client for entry of client profile data;
issuing an automatic system message in response to acceptance of an email address and client profile data entered in response to the prompting, to the client using said email address carrying server generated temporary client credentials, including a one-time-use user name and a one-time-use account authentication code including field contents arranged in ordered set of data fields, for the authentication algorithm;
prompting the client for an entry based on said one-time-use user name and a random subset of said one-time-use account authentication code; and
upon acceptance of said entry based on said temporary client name and said random subset, prompting the client for entry of chosen by the client permanent client credentials, including the account user name and field contents arranged in the ordered set of data fields in accordance with a full pattern chosen by the client for use in the authentication algorithm.

12. The method of claim 10, wherein said at least one mode of operation comprises an account authentication code reset mode for an account, and wherein presenting said interface includes
prompting the client for entry of said account user name;
prompting the client for entry of client profile data; and
upon acceptance of an account user name and client profile data entered in response to the prompting, prompting the client for entry of a new account authentication code including field contents arranged in the ordered set of data fields in accordance with a full pattern chosen by the client for use in the authentication algorithm.

13. The method of claim 10, wherein said at least one mode of operation comprises a client credential reset mode for an account, and wherein presenting said interface includes
prompting the client for said account user name and for an authentication response, including identifying on enumerated positions of a random subset of said ordered set of data fields; and
upon acceptance of an account user name and an authentication response, prompting the client for entry of a new client credential, including a new account user name and new field contents arranged in the ordered set of data fields in accordance with a full pattern chosen by the client, for use in the authentication algorithm.

14. The method of claim 10, including logging events related to account administration in a security database.

15. The system of claim 10, wherein said presenting and accepting are carried out without human intervention.

16. The method of claim 10, wherein said at least one mode of operation comprises a plurality of modes, including an account set up mode in which a client establishes client credentials for a record of a client account in the database, the client credentials including an account user name and field contents arranged in the ordered set of data fields in accordance with a full pattern chosen by the client, an account client credential reset mode for an account in which the client changes both the account user name and the field contents arranged in the ordered set of data fields, and an account authentication code reset mode in which the client changes only the ordered set of data fields.

17. The method of claim 10, wherein said at least one mode of operation comprises a plurality of modes, including an account set up mode in which a client establishes client credentials for a record of a client account in the database, the client credentials including an account user name and field contents arranged in the ordered set of data fields in accordance with a full pattern chosen by the client, an account client credential reset mode for an account in which the client changes both the account user name and the field contents arranged in the ordered set of data fields, and an account authentication code reset mode in which the client changes only the field contents arranged in the ordered set of data fields, and including logging events related to account administration in a security database for said plurality of modes.

18. The method of claim 10, wherein said at least one mode of operation comprises a plurality of modes, including an account set up mode in which a client establishes client credentials for a record of a client account in the database, the client credentials including an account user name and field contents arranged in the ordered set of data fields in accor dance with a full pattern chosen by the client, an account client credential reset mode for an account in which the client changes both the account user name and the field contents arranged in the ordered set of data fields, and an account authentication code reset mode in which the client changes only the field contents arranged in the ordered set of data fields ordered set of data fields, and wherein said presenting and accepting are carried out without human intervention.

* * * * *

UNITED STATES PATENT AND TRADEMARK OFFICE
CERTIFICATE OF CORRECTION

PATENT NO.       : 7,577,987 B2                                       Page 1 of 1
APPLICATION NO.  : 10/378226
DATED            : August 18, 2009
INVENTOR(S)      : Len L. Mizrah It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1276 days.

Signed and Sealed this

Seventh Day of September, 2010

David J. Kappos
*Director of the United States Patent and Trademark Office*